(12) United States Patent
Parsons et al.

(10) Patent No.: US 11,314,016 B2
(45) Date of Patent: Apr. 26, 2022

(54) FIBER CONNECTORS FOR MODE DIVISION MULTIPLEXING USING MULTIMODE OPTICAL FIBERS

(71) Applicant: COMMSCOPE TECHNOLOGIES LLC, Hickory, NC (US)

(72) Inventors: Earl R. Parsons, Allen, TX (US); Paul Francis Kolesar, Wilmington, NC (US); Michael Aaron Kadar-Kallen, Harrisburg, PA (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/261,485

(22) PCT Filed: Jul. 18, 2019

(86) PCT No.: PCT/US2019/042429
§ 371 (c)(1),
(2) Date: Jan. 19, 2021

(87) PCT Pub. No.: WO2020/018809
PCT Pub. Date: Jan. 23, 2020

(65) Prior Publication Data
US 2021/0311247 A1   Oct. 7, 2021

Related U.S. Application Data

(60) Provisional application No. 62/700,662, filed on Jul. 19, 2018.

(51) Int. Cl.
*G02B 6/028* (2006.01)
*G02B 6/14* (2006.01)
(Continued)

(52) U.S. Cl.
CPC ............ *G02B 6/0288* (2013.01); *G02B 6/14* (2013.01); *H04B 10/2581* (2013.01); *H04J 14/04* (2013.01)

(58) Field of Classification Search
None
See application file for complete search history.

(56) References Cited

U.S. PATENT DOCUMENTS 9,481,129 B2   11/2016   Verheyden et al.
9,575,263 B2    2/2017   Gurreri et al.
(Continued)

FOREIGN PATENT DOCUMENTS

WO   2017/223072 A1   12/2017
WO   2018/039206 A1    3/2018

OTHER PUBLICATIONS

International Search Report and Written Opinion of the International Searching Authority for International Patent Application No. PCT/US2019/042429 dated Nov. 8, 2019, 9 pages.
(Continued)

*Primary Examiner* — Darren E Wolf
(74) *Attorney, Agent, or Firm* — Merchant & Gould P.C.

(57) ABSTRACT

A first multimode optical fiber carries a mode division multiplexed (MDM) optical signal. The MDM optical signal is transmitted into a second multimode fiber from the first multimode optical fiber. The first and second multimode fibers are coupled via a fiber connector. The lateral offset between the two fibers at the connector is less than 2 μm.

28 Claims, 18 Drawing Sheets

(51) Int. Cl.
    *H04B 10/2581* (2013.01)
    *H04J 14/04* (2006.01)

(56) References Cited

U.S. PATENT DOCUMENTS

| | | |
|---|---|---|
| 2013/0188951 A1 | 7/2013 | Zheng et al. |
| 2015/0050019 A1 | 2/2015 | Sengupta |
| 2015/0256256 A1 | 9/2015 | Sheth et al. |
| 2015/0286024 A1 | 10/2015 | Kolesar |
| 2015/0333830 A1* | 11/2015 | Chen ............... G02B 6/262 398/178 |
| 2016/0091668 A1* | 3/2016 | Nakazono ......... G02B 6/3809 385/70 |
| 2017/0371217 A1* | 12/2017 | Chu ................. G02F 1/141 |
| 2018/0083727 A1* | 3/2018 | Benner ............. H04Q 11/0071 |

OTHER PUBLICATIONS

AROONA-P2P: A new youth for your LAN; Instruction Manual, CAILabs, 1-21 (Feb. 2017).

AROONA-P2P: A new youth for your LAN; Instruction Manual, CAILabs, 1-21 (Oct. 2017).

Birks, T et al., :The photonic lantern, Advances in Optics and Photonics, 7:107-167 (2015).

Chang, S. et al., "Mode division multiplexed optical transmission enabled by all-fiber mode multiplexer", Optics Express, 22(12): 1-8 (Jun. 2014).

Franz, B. et al., "Mode Group Division Multiplexing in Graded-Index Multimode Fibers", Alcatel-Lucent, Bell Labs Technical Journal, 18(3): 153-172 (2013).

Gross, S. et al., "C-Band Mode-Selective Couplers Fabricated by the Femtosecond Laser Direct-Write Technique", Opt. Fiber Commun. Conf., Optical Society of America, 1-3 (2015).

Labroille, G. et al., "Characterization and applications of spatial mode multiplexers based on Multi-Plane Light Conversion", Optical Fiber Technology, 35: 93-99 (2017).

Ryf, R. et al., "Mode-Division Multiplexing Over 96 km of Few-Mode Fiber Using Coherent 6×6 MIMO Processing", Journal of Lightware Technology, 30(4): 521-531 (Feb. 2012).

100G CWDM4 MSA Technical Specifications 2km Optical Specifications, CWDM4 MSA Technical Specifications, Rev 1.1, pp. 1-16 (Nov. 24, 2015).

Chang, F. et al., First Demonstration of PAM4 Transmissions for Record Reach and High-capacity SWDM Links Over MMF Using 40G/100G PAM4 IC Chipset with Real-time DSP, OFC, 1-3 (2017).

Labroille, G. et al., "30 Gbit/s Transmission over 1 km of Conventional Multi-mode Fiber using Mode Group Multiplexing with OOK modulation and direct detection", Ecoc, 1-4 (2015).

Lengle, K. et al., "4×10 Gbit/s bidirectional transmission over 2 km of conventional graded-index OM1 multimode fiber using mode group division multiplexing", Optics Express, 24(25): 1-12 (Dec. 2016).

Mynbaev, D et al., "Fiber Optic Communications Technology", Prentice Hall, 3 cover pages and pp. 101-106 (2001).

Zitsch, M. et al., "Ultra-Low Insertion Loss of Singlemode Ferrule-Less Connectors", CommScope, 1-8 (admitted prior art as of Jul. 19, 2018).

* cited by examiner

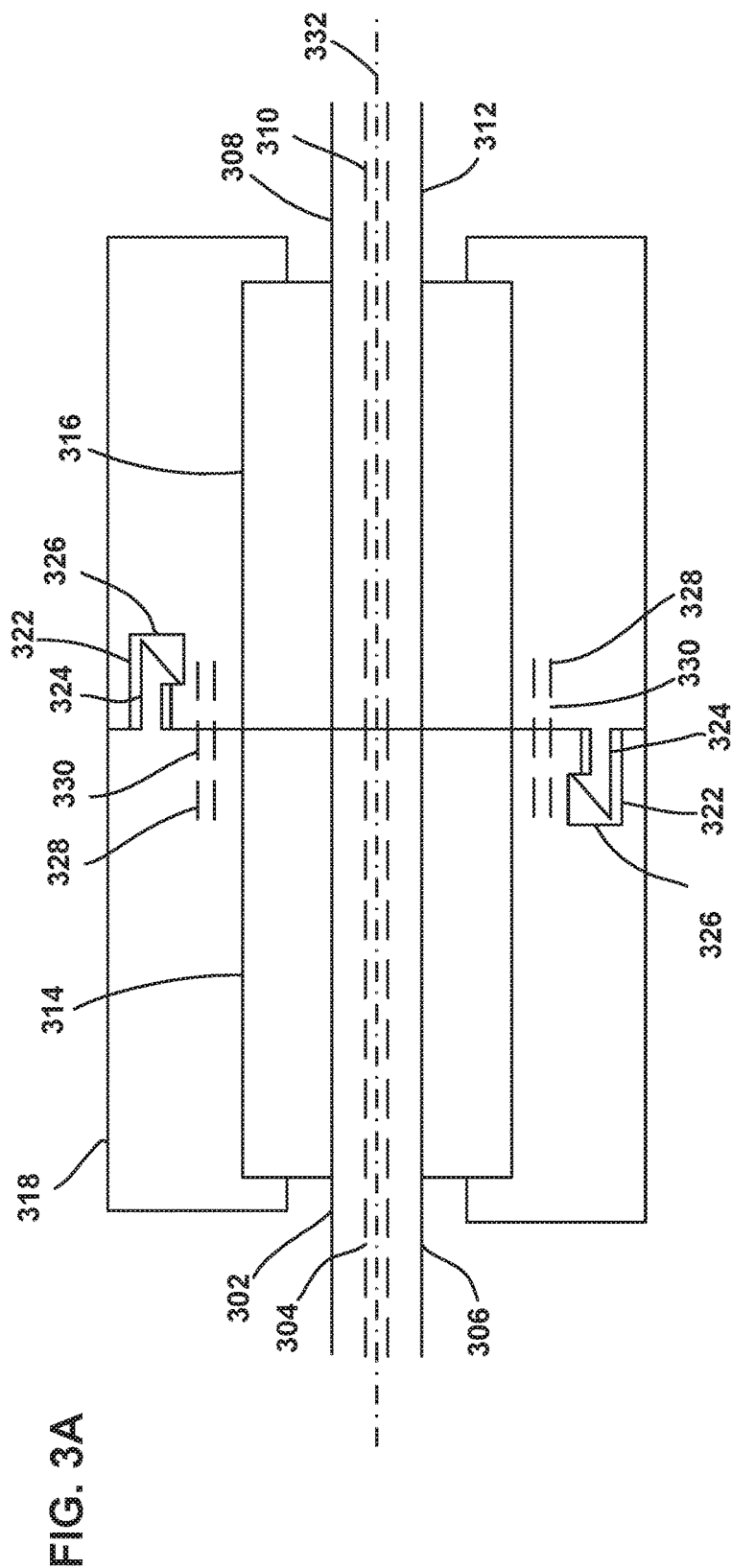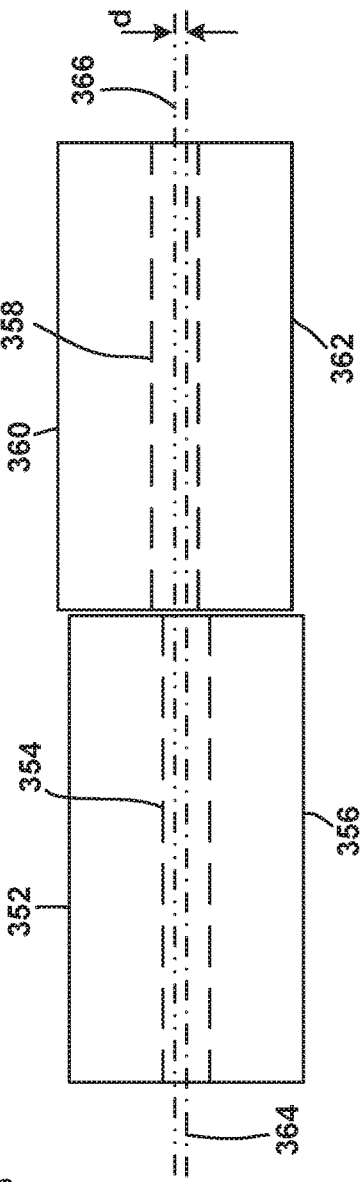

FIBER CONNECTORS FOR MODE DIVISION MULTIPLEXING USING MULTIMODE OPTICAL FIBERS

CROSS-REFERENCE TO RELATED APPLICATION

This application is a National Stage Application of PCT/US2019/042429, filed on Jul. 18, 2019, which claims the benefit of U.S. Patent Application Ser. No. 62/700,662, filed on Jul. 19, 2018, the disclosures of which are incorporated herein by reference in their entireties. To the extent appropriate, a claim of priority is made to each of the above disclosed applications.

BACKGROUND OF THE INVENTION

The present invention is generally directed to optical communications, and more specifically to improved methods of connecting multimode fibers used in mode division multiplexed systems.

Optical signals are transmitted along an optical fiber by injecting light from a light source, typically a semiconductor light emitting diode (LED) or semiconductor laser, into one end of an optical fiber. The light source and the optical fiber need to be in correct alignment so that as much light from the light source is coupled into the optical fiber. Optical fiber communications over distances less than about one kilometer are often carried by multimode fibers, i.e. optical fibers that support the propagation of light along more than one fiber mode. Some of the fiber modes, the lower-order modes, are predominantly located near the center of the fiber core and others, referred to as higher order modes, extend closer to the core-cladding interface.

One of the factors limiting the amount of optical data that can be transmitted along an optical fiber is the bandwidth of the optical fiber channel. One approach being considered for increasing fiber capacity is space division multiplexing (SDM), in which different optical signals are physically (spatially) separated from each other within the same optical fiber. One proposed implementation of SDM relies on a fiber having a single core with a diameter that is larger than required for single-mode operation and which supports the propagation of multiple modes. Different optical signals can be launched into the different spatial modes of the multimode fiber (MMF) at its input end. The light in the different spatial modes can be spatially separated at the output end of the MMF, and so the different optical signals can be retrieved. This particular approach to SDM can be referred to as "mode division multiplexing." A subset of MMFs that are being considered for SDM includes the "few mode fiber," which generally sustains the propagation of a smaller number of modes than the MMF.

Mode division multiplexing (MDM) has garnered attention as a technology that can be used to increase the capacity of installed multimode fiber optic networks. Each separate data signal propagates along its own, separate mode group. This lessens the crosstalk between signals as the modes propagate since, in the absence of mode-mixing events, power coupling between different mode groups is much less likely than power coupling between modes in the same mode group. Data signals can be multiplexed (MUX) and demultiplexed (DEMUX) using devices such as photonic lanterns and multi-plane light conversion (MPLC) units. This approach has been demonstrated on conventional OM1 and OM2 multimode optical fibers, increasing the capacity significantly without the use of multiple input, multiple output (MIMO) or other complex processing algorithms.

Previous demonstrations of MDM either focus on achieving MDM transmission along a single fiber, or fused fibers, or rely on costly and time-consuming signal post-processing to correct for mode mixing. One challenge preventing the wide adoption of MDM technology is the fact that fiber connectors, especially those found in legacy multimode links, are likely unsuitable. In addition, connections may comprise dissimilar fibers with slightly different core positions, core diameters, numerical apertures, and profile shapes. With MDM, any mismatch between the fiber geometries may lead to increased loss, mode mixing, crosstalk, signal degradation, and limited transmission distance.

There is a need, therefore, to develop ways of connecting multimode fibers used in MDM arrangements that does not require fusion splicing and that may be able to use legacy multimode links.

SUMMARY OF THE INVENTION

One embodiment of the invention is directed to an optical communications system that has a first multimode optical fiber that transmits a mode division multiplexed (MDM) optical signal. The first multimode optical fiber has a first end. A first end of a second multimode optical fiber is coupled to receive the MDM optical signal from the first end of the first multimode optical fiber. A multimode fiber connector has a first part holding the first end of the first multimode optical fiber and a second part holding the first end of the second multimode optical fiber, the first and second parts of the multimode fiber connector being in fixed spatial relationship to each other. The lateral offset between the first end of the first multimode optical fiber and the first end of the second multimode optical fiber is less than 2 µm.

Another embodiment of the invention is directed to an optical communications system that has a transmitter portion comprising at least a first optical transmitter capable of generating a first optical signal and a second optical transmitter capable of generating a second optical signal. A first multimode optical fiber has a first end and a second end. A mode division multiplexer is coupled to receive the first optical signal from the first optical transmitter and the second optical signal from the second optical transmitter and is coupled to direct a mode division multiplexed (MDM) optical signal into the first end of the first multimode optical fiber, the MDM optical signal comprising the first and second optical signals. A second multimode optical fiber has a first end and a second end. A multimode fiber connector is attached to the second end of the first multimode optical fiber and the first end of the second multimode optical fiber. The multimode fiber connector aligns the first and second multimode optical fibers so as to transmit the MDM optical signal from the first multimode optical fiber to the second multimode optical fiber. A mode division demultiplexer is coupled to receive the MDM optical signal from the second end of the second multimode optical fiber. A receiver portion comprises at least a first optical receiver coupled to receive the first optical signal from the mode division demultiplexer and a second optical receiver coupled to receive the second optical signal from the mode division demultiplexer.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 3A schematically illustrates an embodiment of an optical connector for coupling two multi-mode optical fibers used in a Mode Division Multiplexing communication system, according to the present invention;

FIG. 3B schematically illustrates lateral offset of one multi-mode optical fiber relative to another;

Figure 1:
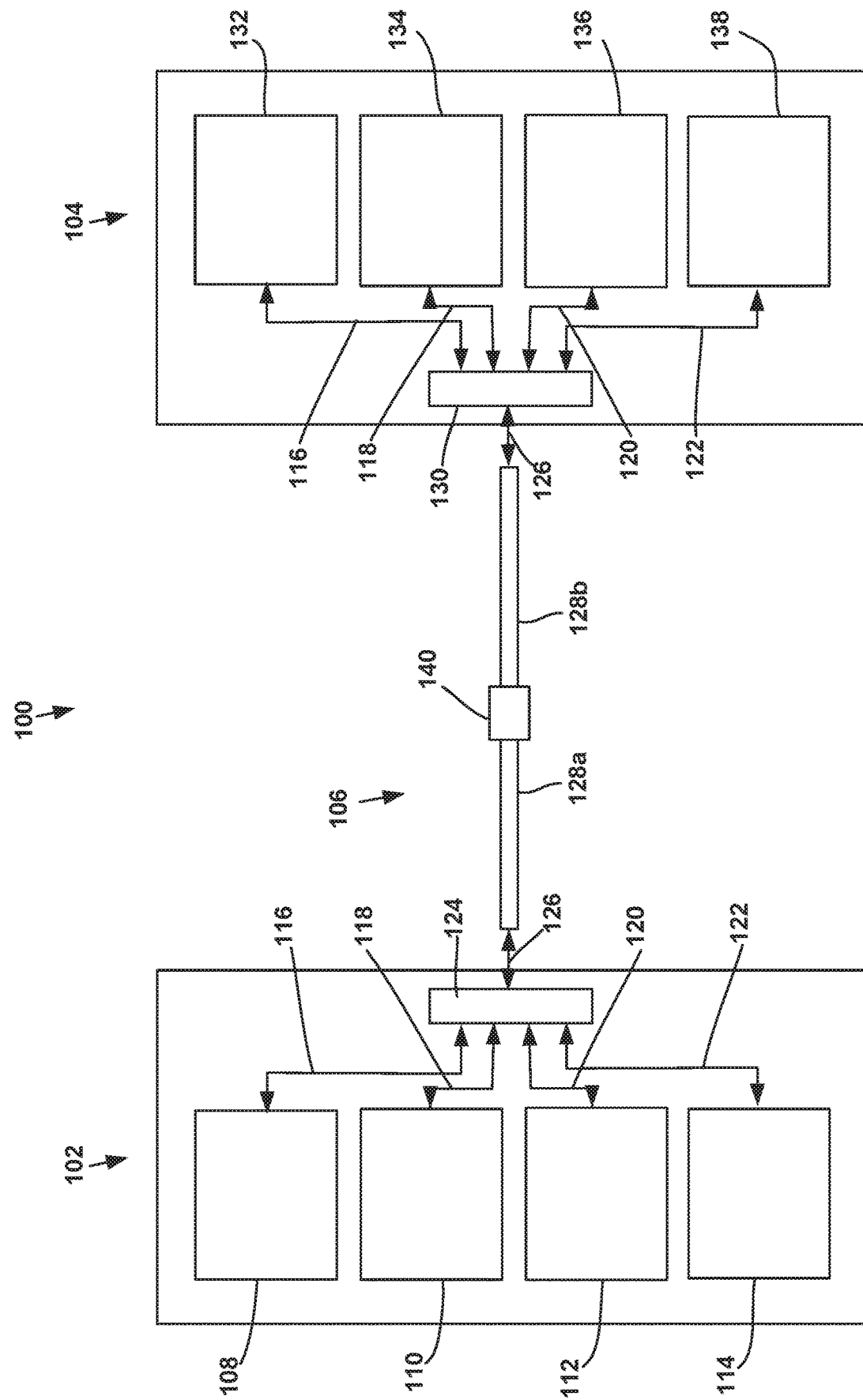
FIG. 1 schematically illustrates an embodiment of an optical communications system that uses space division multiplexing to propagate optical communications signals along a connected multi-mode optical fiber, according to one embodiment of the present invention.
Figure 2A:
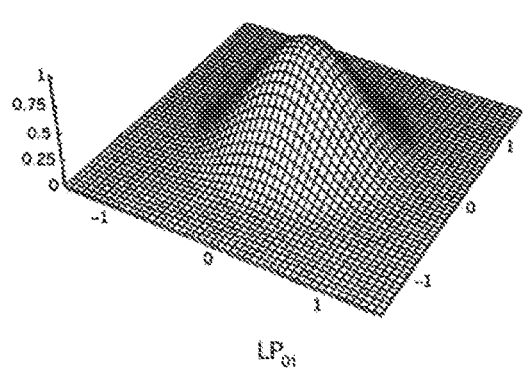
FIGS. 2A-2F illustrate profiles of various LP (Linear Polarization) optical modes that propagate along a multi-mode optical fiber.
Figure 2B:
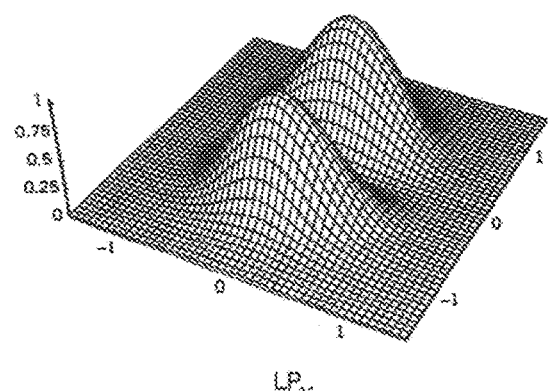
Figure 2C:
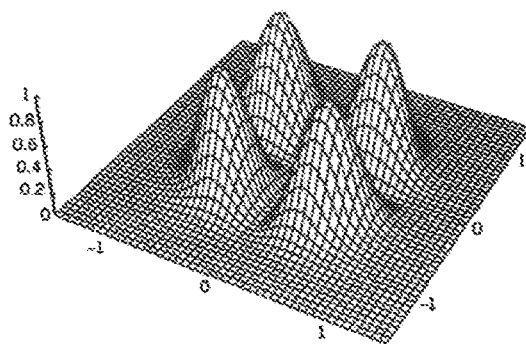
Figure 2D:
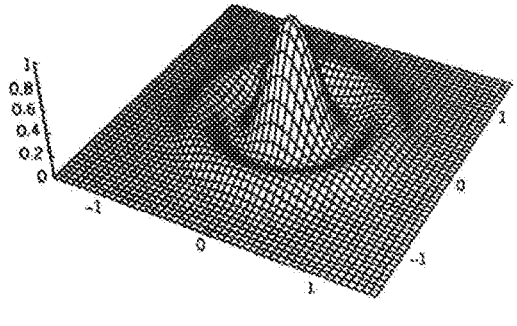
Figure 2E:
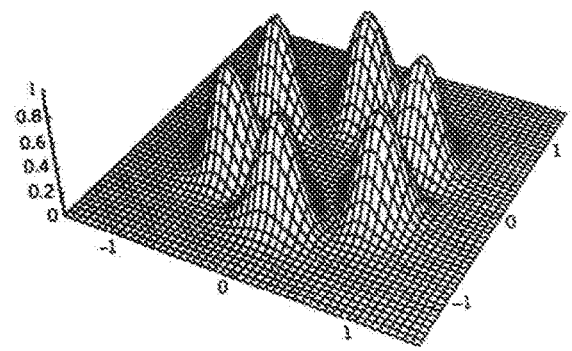
Figure 2F:
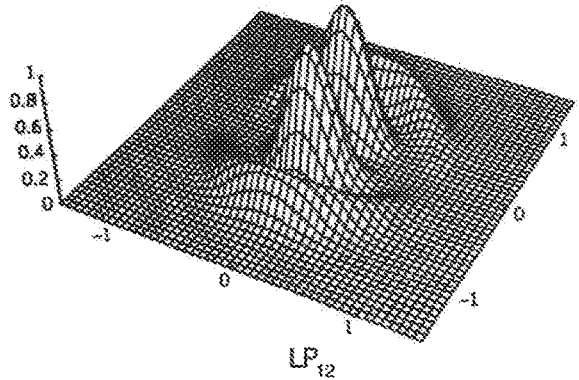

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to an optical system that employs space division multiplexing (SDM) in a multi-mode optical fiber.

An exemplary embodiment of an optical communication system 100 is schematically illustrated in FIG. 1. The optical communication system 100 generally has a transmitter portion 102, a receiver portion 104, and a fiber optic portion 106. The fiber optic portion 106 is coupled between the transmitter portion 102 and the receiver portion 104 for transmitting an optical signal from the transmitter portion 102 to the receiver portion 104.

In this embodiment, the optical communication system 100 is of a mode division multiplexing (MDM) design. Optical signals are generated within the transmitter portion 102 and are combined into different modes of a multi-mode fiber (MMF) 128a of the optical fiber portion 106. The optical signals are directed to the receiver portion 104 where the signals are spatially separated and directed to respective detectors. The illustrated embodiment shows an optical communication system 100 that spatially multiplexes four different signals, although it will be appreciated that optical communications systems may spatially multiplex different number of signals, e.g. two, three or more than four.

Transmitter portion 102 has multiple transmitter units 108, 110, 112, 114 producing respective optical signals 116, 118, 120, 122. The optical communication system 100 may operate at any useful wavelength, for example in the range 800-950 nm, or over other wavelength ranges, such as 1250 nm-1350 nm, 1500 nm-1600 nm, or 1600 nm-1650 nm. Each transmitter unit 108-114 may produce a wavelength division multiplexed (WDM) optical signal that comprises a plurality of components at different wavelengths. In some embodiments, the different wavelengths are separated from each other by at least 10 nm and in other embodiments by more than 15 nm. For example, a transmitter unit may produce a WDM signal having components at 1270, 1290, 1310 and 1330 nm. In another example, the transmitter unit may produce a WDM signal having components at 870 nm, 890 nm, 910 nm and 930 nm. The transmitter unit may produce a WDM optical signal having a different number of wavelength components, for example 2, 3 or more than four. WDM optical signals are often produced by independent generating single wavelength optical signals at the different wavelengths and then combining the single wavelength signals into a WDM signal using an optical wavelength multiplexer.

Many MMFs used for operation at the wavelengths discussed above have a core diameter of 50 μm and a cladding of 125 μm, such as OM2 OM3 and OM4 optical fibers, while OM1 fibers have a core diameter of 62.5 μm and a cladding diameter of 125 μm. Optical fibers with narrower cores, which still support the propagation of more than a single mode but fewer modes than the standard OM1, OM2, OM3 or OM4 fibers, may also be used. Such an optical fiber may be referred to as a few mode fiber (FMF). It should be understood that the terms multi-mode fiber or MMF as used herein are intended to include fibers that may be referred to as few mode fibers. A multi-mode fiber is a fiber that sustains the propagation of more than a single mode.

Each transmitter unit 108, 110, 112, 114 is coupled to the optical fiber system 106 via a mode division multiplexer 124, which directs the optical signals 116, 118, 120, 122 into respective modes of a MMF 128a of the optical fiber system 106.

The mode division multiplexer 124 may be any suitable type of space division multiplexer that directs different optical signals into different modes, or mode groups of a MMF. One approach to implementing a mode division multiplexer 124, attractive because of its low inherent insertion loss, is to employ a photonic lantern, for example as described in Birks T A et al. "The Photonic Lantern," Adv. in Opt. and Phot. (2015) 7 107-167. Another approach that also has low insertion loss is based on Multi-Plane Light Conversion (MPLC). The use of MPLC for MUX and DEMUX in MMFs is described, for example, in Labroille G et al., "Characterization and applications of spatial mode multiplexers based on Multi-Plane Light Conversion," Optical fiber Technology (2017) 35 93-99, incorporated herein by reference. Other techniques have also been reported, for example via the use of binary phase plate converters (see e.g. Ryf R et al. "Mode-division multiplexing over 96 km of few-mode fiber using coherent 6×6 MIMO processing," J. Lightwave Technol. (2012) 30 521-531), and the use of fused couplers (see e.g. Chang S H et al., "Mode division multiplexed optical transmission enabled by all-fiber mode multiplexer," Opt. Express (2014) 22 14229-14236, and Gross S et al., ""C-Band mode-selective couplers fabricated by the femtosecond laser direct-write technique," Opt. Fiber Commun. Conf. (2015) Paper W3B.2.).

The optical fiber system 106 includes the first MMF 128a and a second MMF 128b that is coupled to the first MMF by a multimode fiber connector 140. The combined optical signal 126, comprising the optical signals 116, 118, 120, 122, propagates along the optical fiber system 106 to the receiver portion 104, where it is split into the optical signals 116, 118, 120, 122 corresponding to the different modes of the second MMF 128b that were excited by light from the space division multiplexer 124. Thus, according to this embodiment, the transmitter unit 108 produces a first optical signal 116, which is transmitted via a first mode of the MMFs 128a, 128b to the receiver unit 132, the transmitter unit 110 produces a second optical signal 118 which is transmitted via a second mode of the MMFs 128a, 128b to the receiver unit 134, the transmitter unit 112 produces a third optical signal 120, which is transmitted via a third mode of the MMFs 128a, 128b to the receiver unit 136, and the transmitter unit 114 produces a fourth optical signal 122 which is transmitted via a fourth mode of the MMFs 128a, 128b to the receiver unit 138, with all of the optical signals 116, 118, 120, 122 propagating along the same optical fibers 128a, 128b.

The receiver portion 104 includes a mode division demultiplexer 130 that separates the spatially separated signals propagating out of the second MMF 128b, and directs them to respective receiver units. In this manner, the optical signal 116 may be detected at receiver unit 132 substantially free of optical signals 118, 120 and 122, the optical signal 118 may be detected at receiver unit 134 substantially free of optical signals 116, 120 and 122, the optical signal 120 may be detected at receiver unit 136 substantially free of optical signals 116, 118 and 122, and the optical signal 122 may be detected at receiver unit 138 substantially free of optical signals 116, 118 and 120. If the optical signals are WDM signals, the receiver units may be configured with wavelength demultiplexing units to separate the different wavelength components for independent detection.

As used herein, the term "multiplexer" is a device that combines two or more separate signals into a single signal. A "demultiplexer" is a device that receives a single signal and divides it into two or more signals. Multiplexers and demultiplexers can operate on various aspects of the optical signal, for example wavelength or spatial position within a fiber. In many cases, the same device can act as a multiplexer for optical signals passing through in a first direction and as a demultiplexer for optical signals passing through in the opposite direction.

In many optical communications systems optical signals propagate in both directions along an optical fiber channel. This possibility is indicated in FIG. 1, where the optical signals are designated with double-headed arrows. In such a case, the transmitter units and receiver units may be replaced by transceiver units that generate and receive signals that propagate along a particular mode of the MMFs 128a, 128b.

In other embodiments, there may be a separate transmitter unit and receiver unit for a signal at each end of the optical fiber system 106.

Because the individual optical signals propagate along respective modes, or groups of modes, of the first MMF 128a, it is important that the fiber connector 140 accurately align the modes of the first MMF 128a to the equivalent modes of the second MMF 128b. This helps to reduce transmission loss and crosstalk between optical signals. In particular, the present invention is directed to reducing the impact of lateral offset in MDM systems, such that the need for multiple input, multiple output (MIMO) processing is reduced, or even eliminated.

The propagation of light along a MMF is well characterized by the set of $LP_{mn}$ ("linear polarization") modes, where m and n are integers. These are described in standard textbooks, such as "Fiber Optic Communications Technology," D. K. Mynbaev and L. L. Scheiner, Prentice Hall, 2001, Upper Saddle, N.J. FIGS. 2A-2F respectively show the normalized intensity profiles of the lowest LP modes, namely $LP_{01}$, $LP_{11}$, $LP_{21}$, $LP_{02}$, $LP_{31}$, and $LP_{12}$. In general, the lowest order modes tend to concentrate the optical power near the center, or axis, of the fiber core, while the higher order modes tend to have the optical power away from the axis.

An exemplary connector used for connecting one MMF to another MMF is schematically illustrated in FIG. 3A. A first MMF 302 has a first core 304, shown in dashed lines, surrounded by a first cladding 306. A second MMF 308 has a second core 310, also shown in dashed lines, surrounded by a second cladding 312. The end of each fiber 302, 308, is surrounded by a respective ferrule 314, 316, which may be formed of plastic, metal or some other suitable material. A first housing 318 is provided on the first ferrule 314, and a second housing 320 is provided on the second ferrule 316. The housings 318, 320 permit the MMFs to be held in optical alignment so as to permit an optical signal to couple from the end of one MMF into the end of the other MMF. To this end, the housings 318, 320 are provided with a locking feature 322 that permits the two housings 318, 320 to be locked together in a fixed position. In the illustrated embodiment, the locking feature 322 includes a spring arm 324 having a protrusion at one end on one housing, 318, 320. The spring arm 324 is inserted into a recess 326 on the other housing 318, 320 where the protrusion interfaces with a ledge of the recess 326. It will be appreciated that other locking mechanisms may be used to lock the housings 318, 320 together in fixed relative position. In this illustration, the axis 332 (shown as a dot-dashed line) of the first MMF 302 lies coincident with the axis of the second MMF 308.

The housings 318, 320 are also provided with an alignment feature 328 that ensures that the first MMF 302 is aligned to the second MMF 308. In the illustrated embodiment, the alignment feature 328 includes pins 330 (shown in dashed lines) that are inserted into alignment holes in the housings 318, 320. Other types of alignment feature may be used to ensure alignment between the MMFs 302, 308.

It will be appreciated that many different designs of connector may be used in the present invention including, for example, LC, MPO and SC connectors. However, as discussed below, such designs of connector may require manufacturing to smaller tolerances to achieve low loss, low crosstalk MDM operation.

FIG. 3B schematically illustrates two MMFs 352, 358. The first MMF 352 has a first core 354 in a first cladding 356. The first MMF 352 has a first fiber axis 364, shown with a dot-dashed line, that corresponds to the center of the first core 354. The second MMF 358 has a second core 360 in a second cladding 362. The second MMF 358 has a second fiber axis 366, shown with a dot-dot-dashed line, that corresponds to the center of the second core 360. In the illustrated embodiment, the first and second fiber axes 364, 366 are not coincident, but are laterally offset from each other by an amount shown as "δ." The separation, δ, is referred to herein as the lateral offset. If the axes 364, 366 are coincident, then there is no lateral offset and δ equals zero.

Figure 3C:
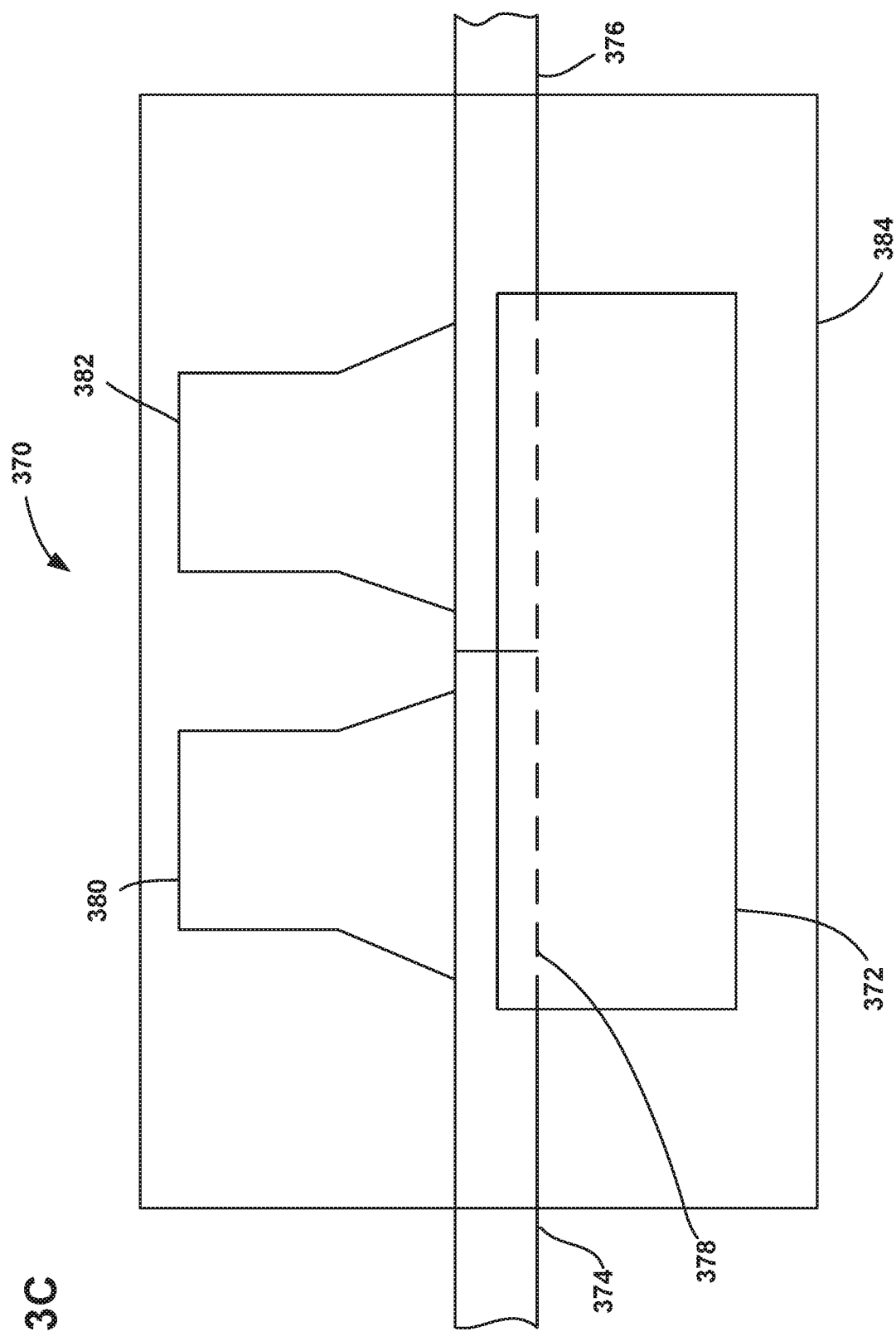
FIG. 3C schematically illustrates an embodiment of a ferrule-less fiber connector for coupling multi-mode optical fibers used in a Mode Division Multiplexing communication system, according to the present invention.

Other types of fiber connector, which do not require the use of a ferrule, may be used. One embodiment of a ferrule-less connector 370 is schematically illustrated in FIG. 3C. The connector 370 includes an alignment block 372 on which two fibers 374, 376 are aligned with each other. The alignment block 372 may include, for example, a v-groove 378, or elongated recess on the surface of the alignment block 372 with some other suitable cross-section, in which the fibers 374, 376 sit in alignment. A first pressure element 380 applies pressure to the first fiber 374 to maintain its location in the v-groove 378. A second pressure element 382 applies pressure to the second fiber 376 to maintain its location in the v-groove 378. In other embodiments, the two fibers 374, 376 may receive pressure from the same element to maintain their position in the v-groove 378. The connector 370 may be contained within a housing 384. The ferrule-less connector 370 may include other elements, not shown, for example elements that push each fiber 374, 376 longitudinally towards the other fiber so as to ensure contact at the ends of the fibers 374, 376, and thus enhance coupling efficiency, and elements to exert force on the pressure elements 380, 382 to hold their respective fibers 374, 376 in place.

One example of a suitable design of a ferrule-less connector includes the 3M Volition™ VF-45 connector. Other examples of ferrule-less connectors include designs shown and described in U.S. Pat. No. 9,575,263; PCT Publication No. WO2017/223072; and U.S. Pat. No. 9,481,129, the disclosures of which are hereby incorporated by reference. However, as discussed below, such designs of connector may require manufacturing to tighter tolerances to achieve low loss, low crosstalk MDM operation. Embodiments of ferrule-less connectors may also be used, for example connectors in which the fibers are held in a v-groove by a force generated by bending the fiber, in which case the pressure elements 380, 382 may not be needed. Some embodiments of ferrule-less connector may provide an advantage over a ferruled connector for meeting the tighter tolerances required for connecting MMFs carrying a MDM optical signal, due to the absence of the ferrule and its concomitant causes of misalignment.

The following describes the results of experiments that lead the present inventors to understand that, contrary to popular belief, efficient MDM can be achieved using connected MMFs.

The experiments on MPLC MUX and DEMUX discussed below used utilized the first four Laguerre polynomial mode groups in an OM4 gradient index fiber. Mode group 1 includes the $LP_{01}$ mode only, mode group 2 includes the $LP_{11a}$ and $LP_{11b}$ modes, mode group 3 includes the $LP_{02}$, $LP_{21a}$, and $LP_{21b}$ modes, and mode group 4 includes modes $LP_{31a}$, $LP_{31b}$, $LP_{12a}$ and $LP_{12b}$. Each optical signal was propagated in a different mode group. There is strong inter-mode coupling within the groups, but weak inter-mode coupling between modes of different groups. Thus, injection of an optical signal into a specific mode effectively injects the optical signal into the mode group that contains that specific mode. The optical group velocity for modes within a group are similar, so dispersion is low, even if the optical signal couples between modes within the group. MPLC multiplexers were used to multiplex and demultiplex multimode optical signals. An MPLC multiplexer maps a single mode input to one mode in the target mode group. In this case, the target modes for the different groups were: for mode group 1—the $LP_{01}$ mode, for mode group 2—the $LP_{11a}$ mode, for mode group 3—the $LP_{21a}$ mode, and for mode group 4—the $LP_{31a}$ mode. The MPLC DEMUX device maps signals from all of the modes of a specific mode group onto a single multimode fiber. This allows all of the optical power in the mode group to be captured by the receiver even if the optical signal is mixed among the modes within a mode group. This setup utilized bidirectional transmission. Mode groups 1 and 4 propagated in one direction, and mode groups 2 and 3 in the other.

A Laguerre polynomial mode group is adjacent to another Laguerre mode group if the mode group numbers differ by one. For example, the Laguerre mode group 2, that includes the $LP_{11a}$ and $LP_{11b}$, is adjacent to mode group 1 and to mode group 3. However, the mode groups that carry the MDM optical signals need not all be adjacent. In other words, for an MDM optical signal to be carried by only adjacent mode groups, there is no gap in the mode group numbers that carry the optical signal, for example by mode groups 1, 2, and 3, or by mode groups 2, 3, and 4. If a MMF carries an MDM optical signal in mode groups 1 and 4, then the signal is carried by non-adjacent mode groups. By way of further example, if the MDM optical signal is carried by mode groups 1, 3 and 5, but not by mode groups 2 or 4, then the MDM optical signal is carried only by non-adjacent mode groups. Furthermore, the optical signal may be carried by mode groups 1, 2 and 4. In such a case, the optical signal carried by at least two adjacent mode groups (groups 1 and 2), but not all the mode groups carrying the signal are adjacent, e.g. mode group 4. In yet another example, the optical signal is carried by mode groups 1, 2, and 3 and by mode groups 7, 8, and 9. In such a case, there are two collections of adjacent modes groups, viz. a first collection of adjacent mode groups comprising mode groups 1, 2, and 3, and a second collection of adjacent mode groups comprising mode groups 7, 8, and 9. However, the two collections of adjacent mode groups are not adjacent to each other, because the mode groups between the collections, i.e. mode groups 4, 5, and 6, are not used to carry the optical signal.

Experiment 1: Transmission Testing

Figure 4:
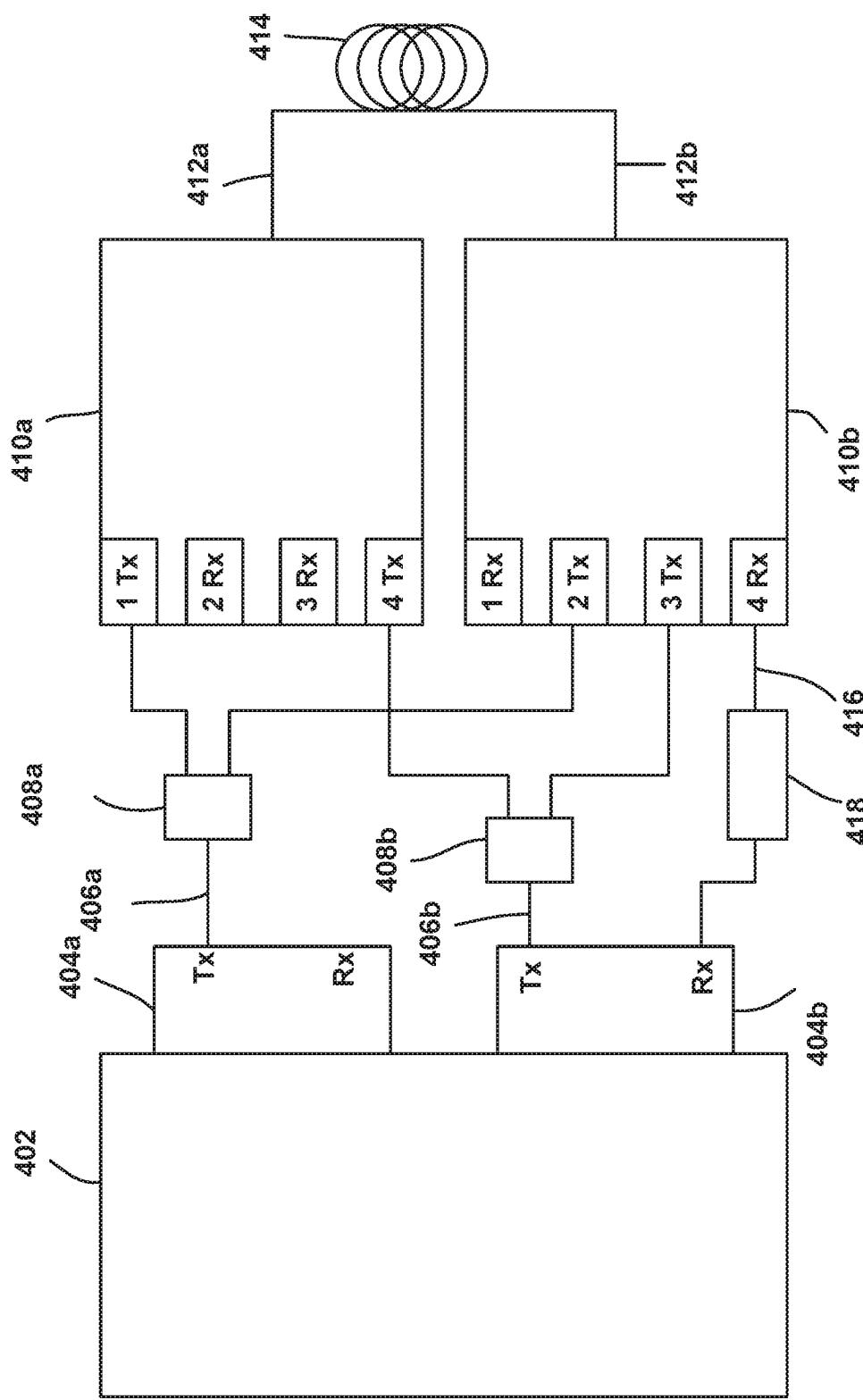
FIG. 4 schematically illustrates an experimental set up used for measuring transmission loss in a mode division multiplexed optical communication system.
Figure 5A:
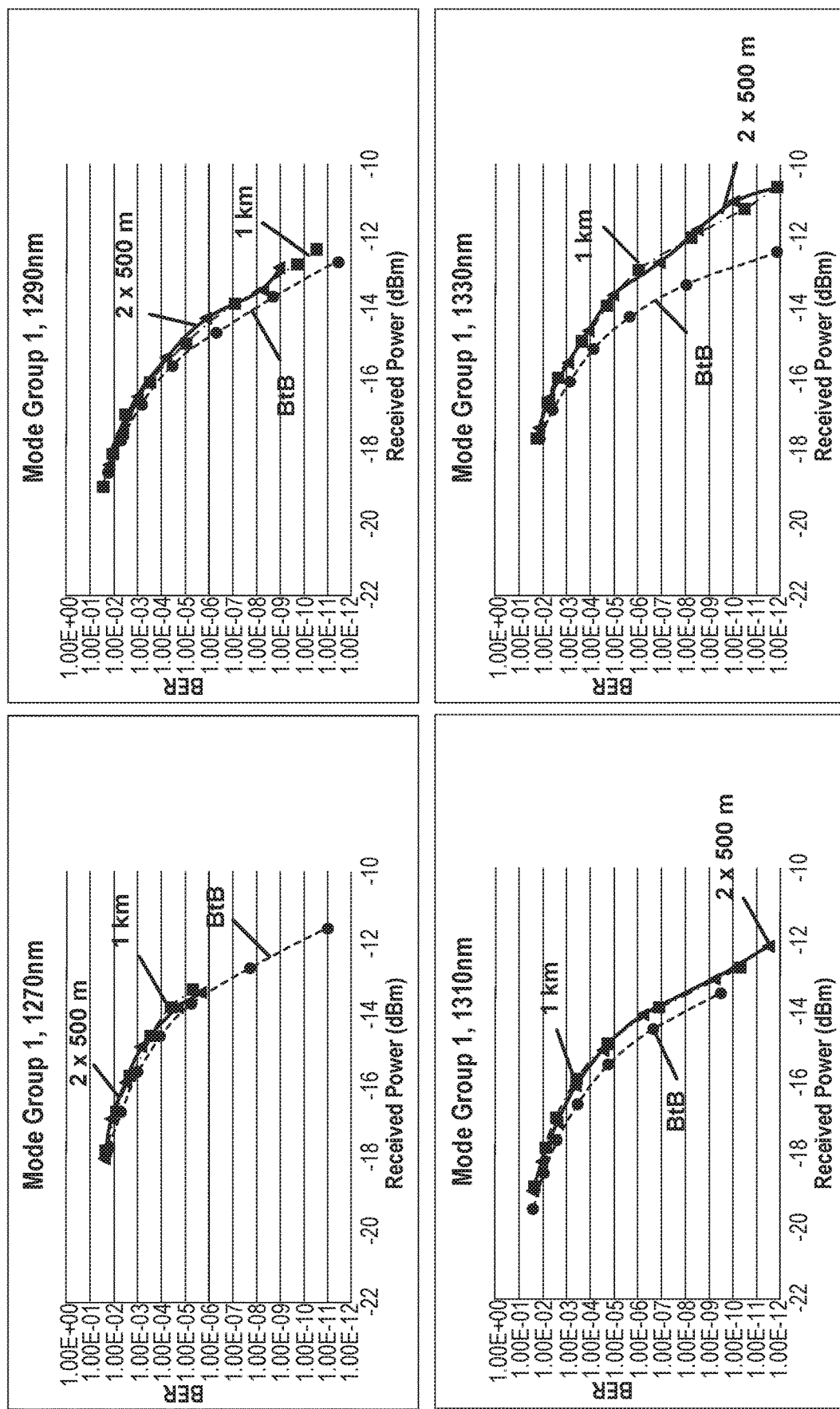
FIGS. 5A to 5D present graphs showing bit error rate as a function of received power for four different wavelengths for the four respective mode groups tested using the apparatus schematically illustrated in FIG. 4, for three different fiber configurations. For each graph the received power is shown on the x-axis, over a range of −22 dBm to −10 dBm, and the bit error rate is shown on the y-axis over a range of $10^{-13}$ to 1.
Figure 5B:
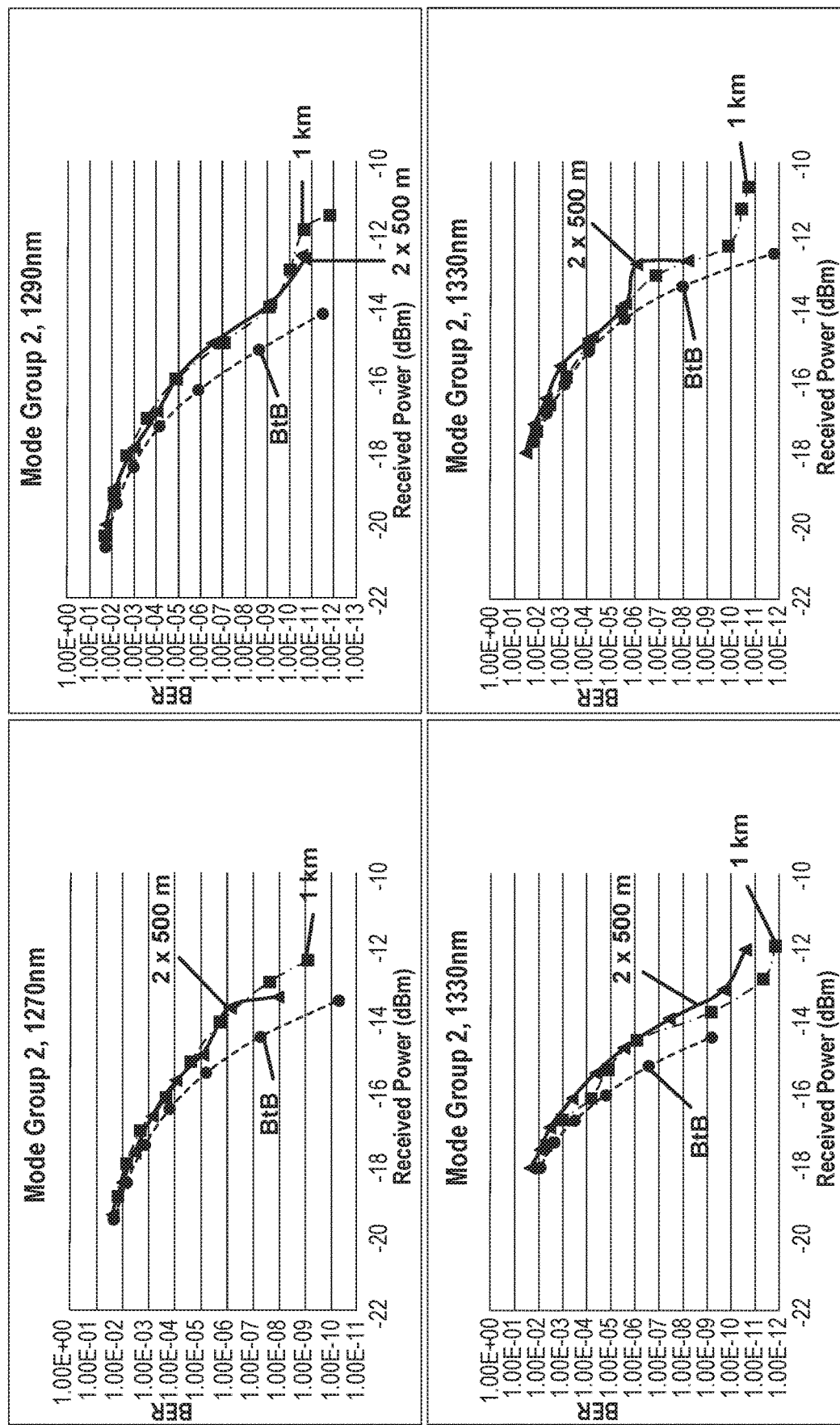
Figure 5C:
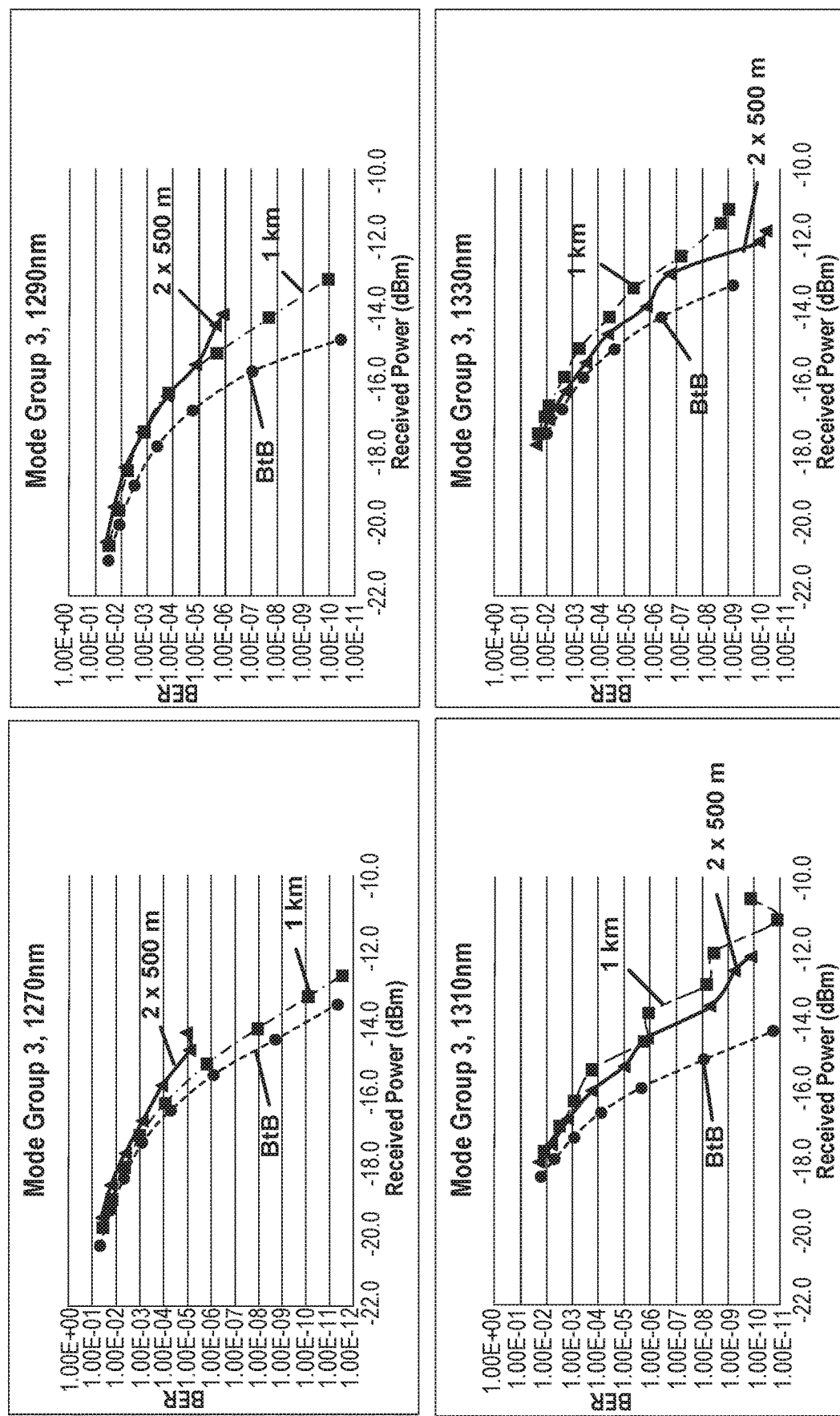
Figure 5D:
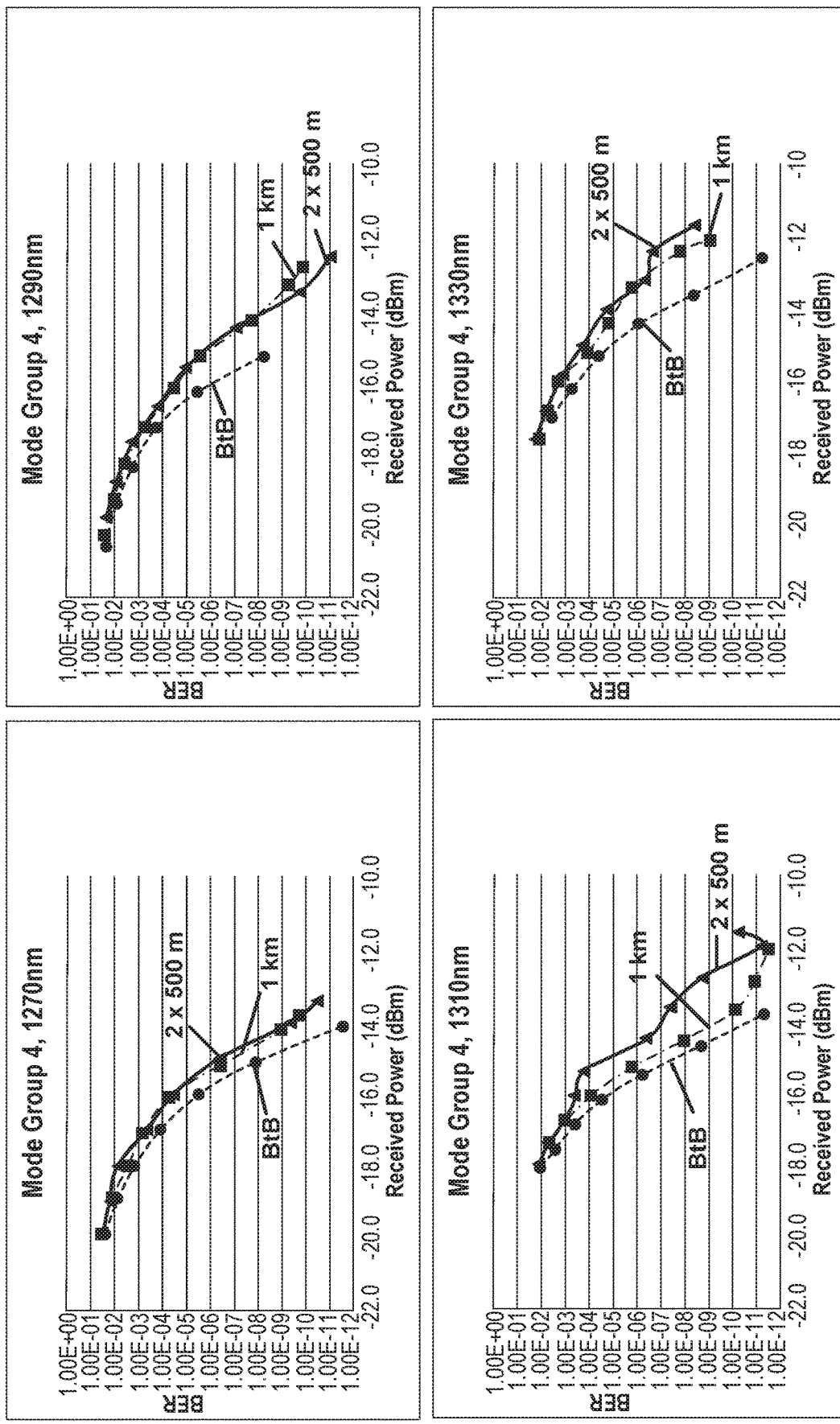

The experimental setup used for transmission testing is as illustrated in FIG. 4. A 40G Ethernet Tester 402, an Anritsu model MT1100A, available from Anritsu Company, Allen, Tex., was coupled to first and second 40G universal transceivers 404a, 404b, Arista model no. XVR-00071-01 transceivers, available from Arista Networks, Inc., Santa Clara, Calif. Each transceiver 404a, 404b was capable of simultaneously transmitting at four wavelengths, viz., 1270 nm, 1290 nm, 1310 nm, and 1330 nm, at 10 Gbit/s for each wavelength. In other words, the optical signal produced by each transceiver 404a, 404b was a wavelength division multiplexed signal. The first and second transceivers 404a, 404b were interoperable with transceivers compliant to IEEE 40GBASE-LR4. The transceivers 404a, 404b allocated 2.0 dB of the power budget for connector loss. The average connector loss is expected to be less than 0.5 dB assuming 4 connectors in a typical structured cabling link, or less than 1.0 dB for the cases with 2 connectors. Each transceiver 404a, 404b had a transmit port, marked Tx and a receive port, marked Rx.

The optical signals transmitted by the first and second transceivers 404a, 404b were directed along respective fibers 406a, 406b to respective 3-dB splitters 408a, 408b before being launched into the respective first and second MPLC MUX/DMUXs 410a, 410b, Aroona model P2P multiplexers available from CaiLabs SAS, Rennes, France. In the particular setup illustrated in FIG. 4, the optical signal from the first universal transceiver 404a was directed to the port on the DMUX side of the first MUX/DMUX 410a corresponding to mode group 1 and the port on the DMUX side of the second MUX/DMUX 410b corresponding to mode group 2. Simultaneously, the optical signal from the second universal transceiver 404b was directed to the port on the DMUX side of the first MUX/DMUX 410a corresponding to mode group 4 and the port on the DMUX side of the second MUX/DMUX 410b corresponding to mode group 3.

The ports on the MUX sides of the first and second MUX/DMUXs 410a, 410b were OM4 multimode fibers 412a, 412b and were either spliced together for back-to-back measurements (BtB), spliced to a 1000 m spool of OM4 fiber 414 (1 km OM4), as illustrated, or spliced to two 500 m spools of OM4 that were spliced together for 1000 m transmission distance (2×500 m OM4). The two 500 m spools were not obtained from the same preform, and so it is possible that there was a core diameter or numerical aperture mismatch.

Optical signals were launched into all four mode groups simultaneously. Optical signals were transmitted from the first MUX/DMUX 410a along mode groups 1 and 4 to the second MUX/DMUX 410b, and from the second MUX.DMUX 410b along mode groups 2 and 3 to the first MUX/DMUX 410a. By launching into 4 separate modes, the aggregate data rate was 160 Gbit/s.

For detection, the signal from each mode group was captured one at a time at the DEMUX side of the MUX/DMUXs 410a, 410b by a multimode patch cord 416, passed through a variable attenuator 418, and received by the respective universal transceiver 404a, 404b. In the illustrated embodiment, the signal transmitted by the second universal transceiver 404b to mode group 4 in the first MUX/DMUX 406a was detected via the mode group 4 port of the second MUX/DMUX 406b and ultimately transmitted to the receive port of the second universal transceiver 404b via the variable attenuator 418. To measure the optical signal transmitted in mode group 1, the patch cord 416 was connected to the mode 1 port on the DMUX side of the second MUX/DMUX 410b. To detect the optical signals transmitted via mode groups 2 and 3, the variable attenuator 418 was connected to the receive port of the first universal transceiver 404a. To measure the optical signal transmitted by mode group 2, the patch cord 416 was then connected to the mode group 2 port of the first MUX/DMUX 410a, and to measure the optical signal transmitted by mode group 3, the patch cord 416 was connected to the mode group 3 port of the first MUX/DMUX 410a.

Transmission testing was carried out for back-to-back conditions as well as over the 1 km OM4 fiber and the 2×500 m OM4 fibers. The bit error rate (BER) was measured against received power for each wavelength in each mode group. FIGS. 5A-5D show the experimental results for mode groups 1-4, respectively. For each case, the curve marked "BtB" (data points represented by diamonds) represents the results obtained when the ports 412a and 412b were operated back-to-back. The curve marked "1 km" (data points represented by squares) represents the results when the single 1 km spool of OM4 fiber was used. The curve marked "2×500 m" (data points represented by triangles) represents the results when the two 500 m spools of OM4 fiber were used. In all cases the graphs show BER over the range of 1 to $10^{-12}$ and the received power given as −22 dBm to −10 dBm.

In some cases, the MUX/DMUX insertion loss limited the available received power. The results for mode group 1 yielded smooth curves. Some stair-step behavior is apparent for mode groups 2, 3 and 4. This suggests that for these mode groups there is some coupling between the mode groups that is time varying due to fiber propagation. For all cases the power penalty is small, on the order of 2 dB or less. While performance is similar for the 1000 m spool and the 2×500 m spools spliced together across all mode groups, the continuous spool seems to have smoother behavior for more cases. This may be due to a fiber parameter mismatch between the two 500 m OM4 fibers introducing mode mixing.

Experiment 2: Mode Group Loss v. Lateral Offset

Figure 6:
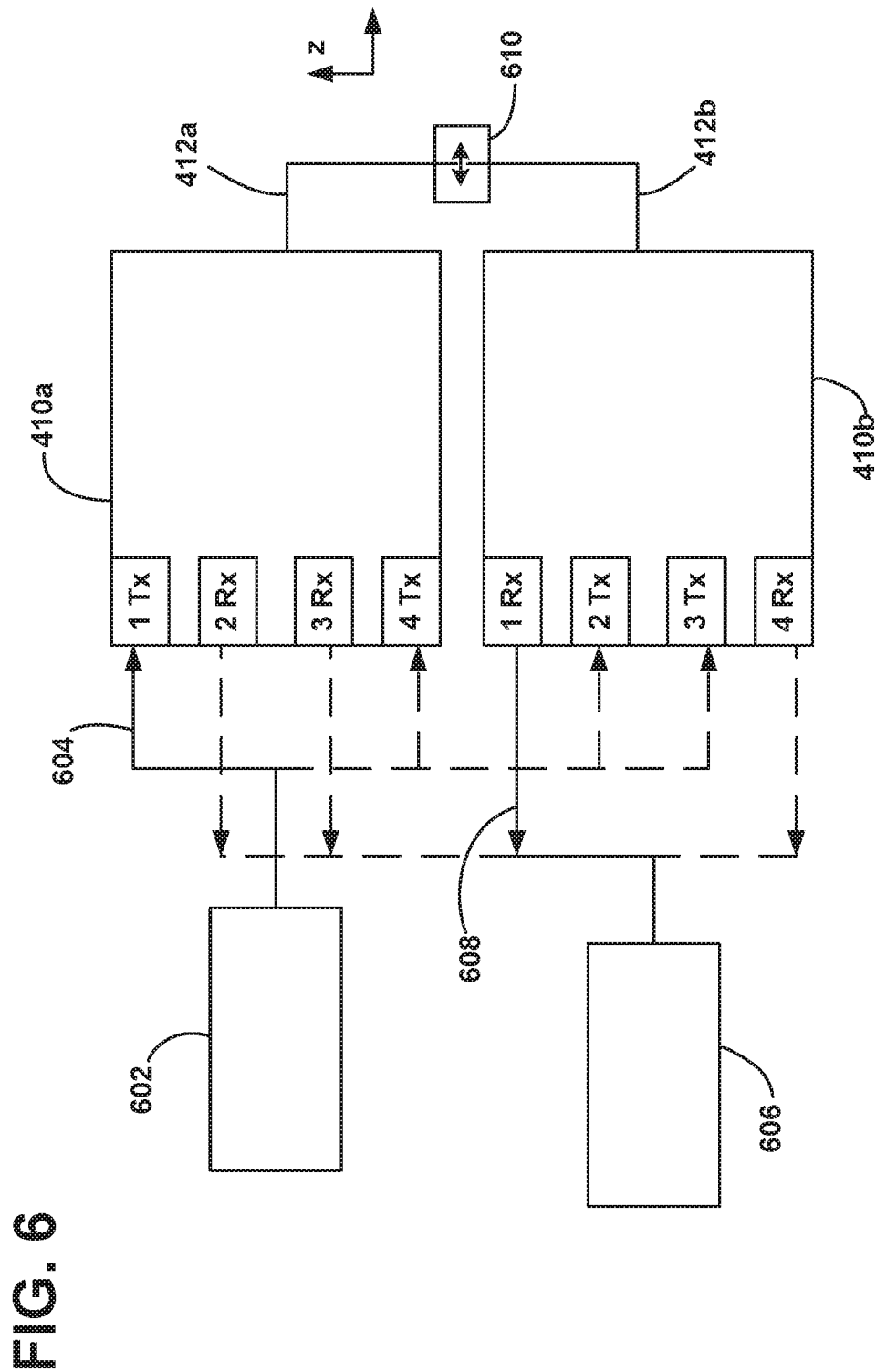
FIG. 6 schematically illustrates an experimental setup used for measuring transmission and cross-talk dependence on lateral offset.

The insertion loss for the four mode groups was measured, as well as the crosstalk between copropagating mode groups, using the arrangement shown in FIG. 6. A laser light source 602, operating at 1310 nm, is connected via a MMF 604 to the DMUX port of the first MUX/DMUX 410b corresponding to the mode group under investigation. In the illustrated embodiment, the MMF 604 is connected to the mode group 1 port of the first MUX/DMUX 410a. A power detector 606 is connected to the port of the corresponding mode group of the second MUX/DMUX 410b. The power detector 606 and the light source 602 were part of an OP930 IL/RL Test Set marketed by Optotest Corporation, Camarillo, Calif. Thus, in the illustrated embodiment, the power detector 606 is coupled via MMF 608 to the second MUX/DMUX 410b. The dashed lines in the figure illustrate the possibilities of measuring the transmission for the various other mode groups.

Light is coupled from the first MUX/DMUX 410a to the second MUX/DMUX 410b via MMFs 412a and 412b. A translation stage 610 changes the relative position of the end of one MMF 412a, 412b relative to the end of the other MMF 412, 410, so as to measure the effect of lateral offset. According to the co-ordinate system shown in the figure, the z-direction is parallel to the axis of the MMFs 412a, 412b, the x-direction is orthogonal to the z-direction and in the plane of the figure, while the y-direction (not shown) is orthogonal to both the x-direction and the z-direction, and is directed into the plane of the figure.

Figure 7A:
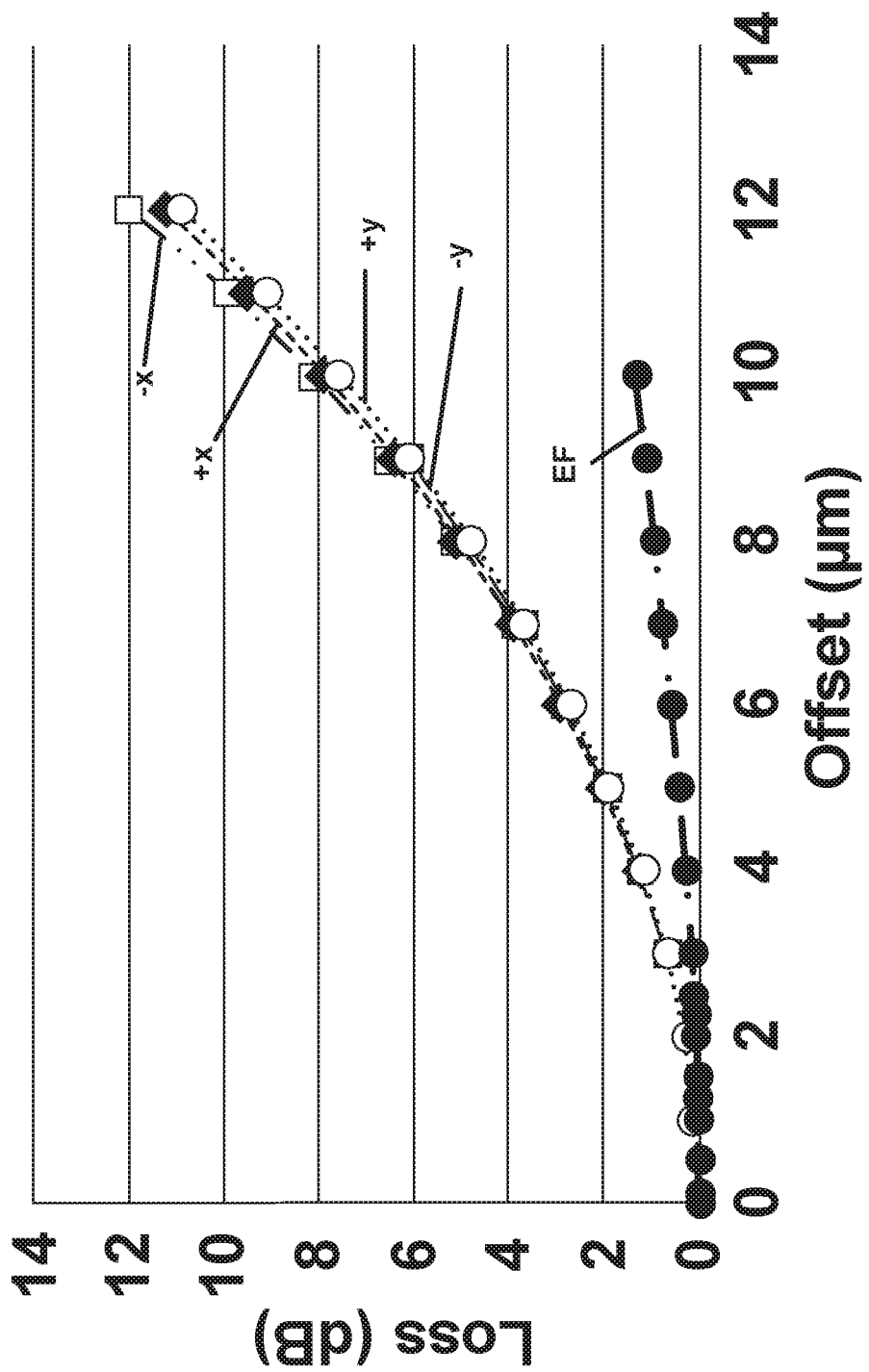
FIGS. 7A-7D present graphs showing transmission loss as a function of lateral offset for four different offset directions, for the respective four mode groups measured using the apparatus schematically illustrated in FIG. 6.

The two MMFs 412a, 412b fibers were aligned such that the received power at 10 μm from the center point in all four directions, i.e. the +x, −x, +y and −y directions, was equal. The results for mode groups 1-4 are respectively presented in FIGS. 7A-7D. FIG. 7A shows the loss for mode group 1 as a function of lateral offset in the four directions, +x, −x, +y and −y. The loss increases with lateral offset. Also, the loss is similar when the lateral offset is made in all four directions, i.e. +x, −x, +y and −y. This similarity is due to the symmetrical nature of the $LP_{01}$ mode and demonstrates that the fibers are well centered at 0 μm offset. For a lateral offset less than 2 μm, the loss is less than 0.5 dB and is 1 dB when the lateral offset is less than 4 μm. FIG. 7A also shows a curve, labeled "EF," which shows the loss as a function of lateral offset for two identical OM4 fibers with encircled flux (EF) compliant launch, i.e. launching into many modes and mode groups. For the EF curve, the 1 dB loss is observed at an offset of 8 µm. The loss experienced by the $LP_{01}$ mode is higher than the EF launch, for a particular value of offset, because the targeted launch area for the $LP_{01}$ mode is smaller than the core of the MMF. Multimode links that use MDM will require tighter tolerance lateral offset for their connectors to achieve the same loss targets that traditional multimode links enjoy.

Figure 7B:
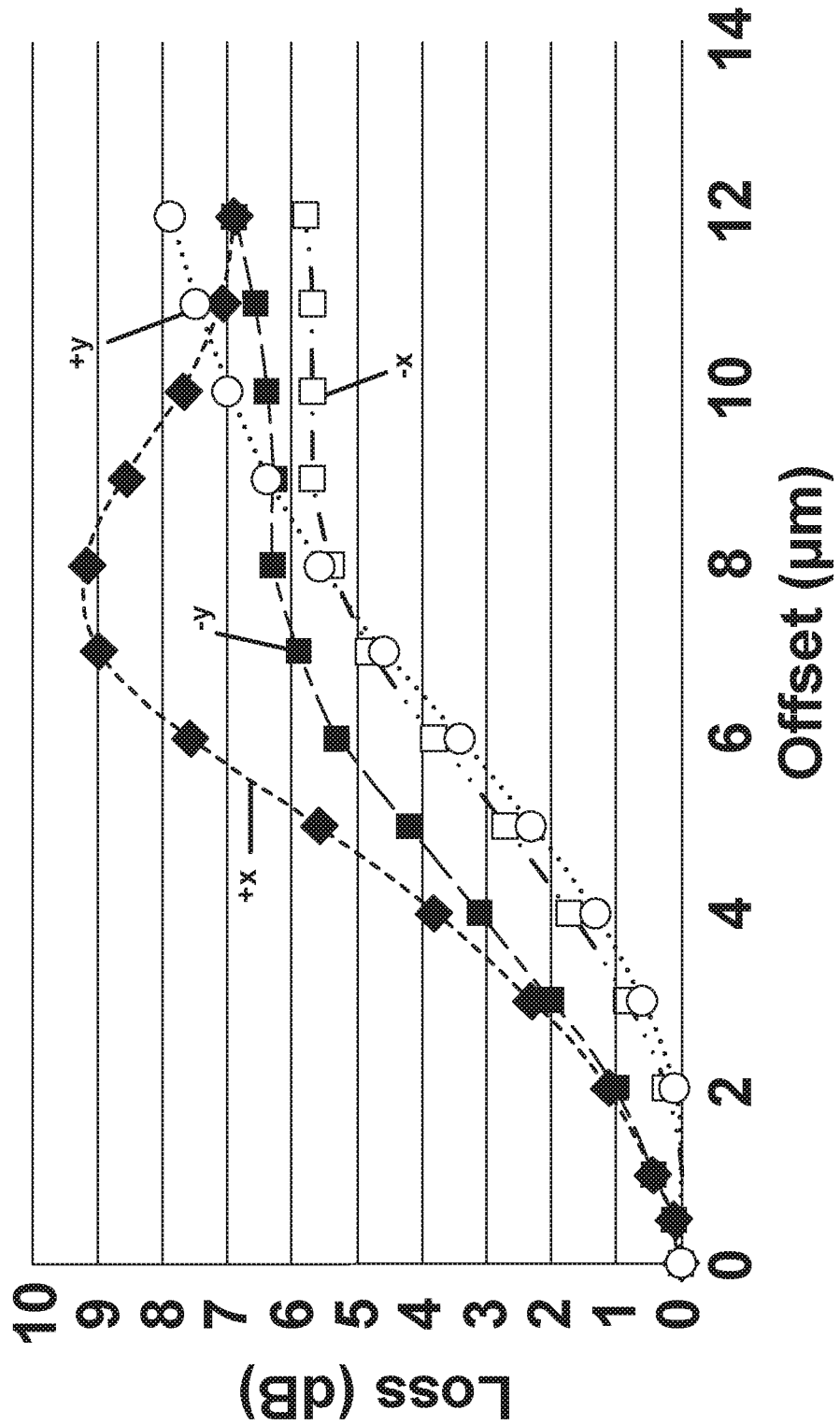

The insertion loss for mode group 2 as a function of lateral offset is shown in FIG. 7B. In this case the loss curves are asymmetrical, with the +x and −y directions experiencing higher losses in the 0-8 µm range. However, even in the worst case for mode group 2, a 2 µm lateral offset resulted in a 1 dB loss, falling to 0.5 dB loss at 1 µm.

Figure 7C:
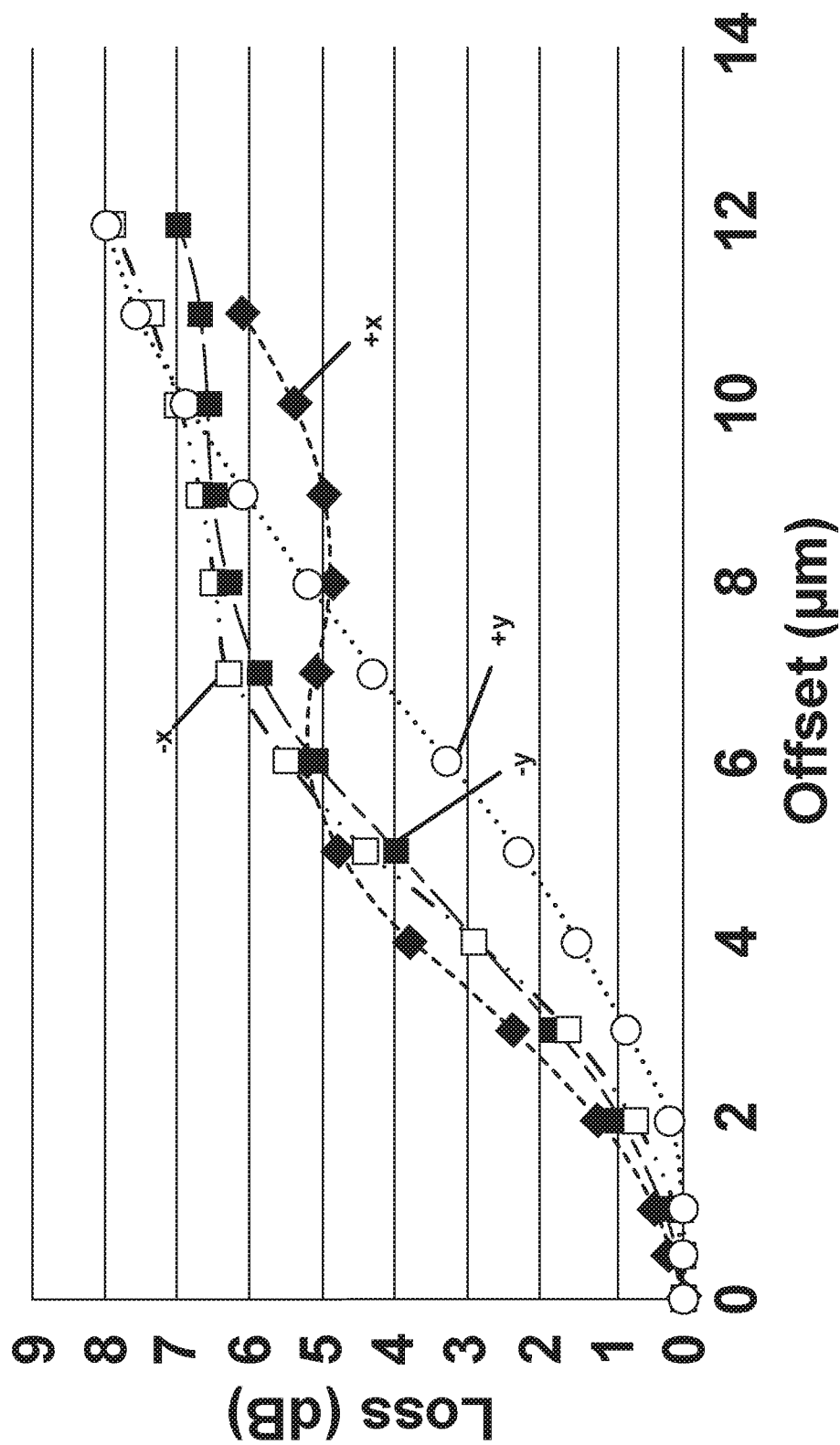

FIG. 7C shows the loss for mode group 3 as a function of lateral offset. While there is less variability between the four quadrants than with mode group 2, there is still significant difference in loss. Mode group 3 is still much more sensitive to lateral offset than an EF compliant multimode fiber, as the 1 dB threshold is achieved crossed reaching a lateral offset of 2 µm offset, and 0.5 dB loss is observed at a lateral offset of less than 1 µm.

Figure 7D:
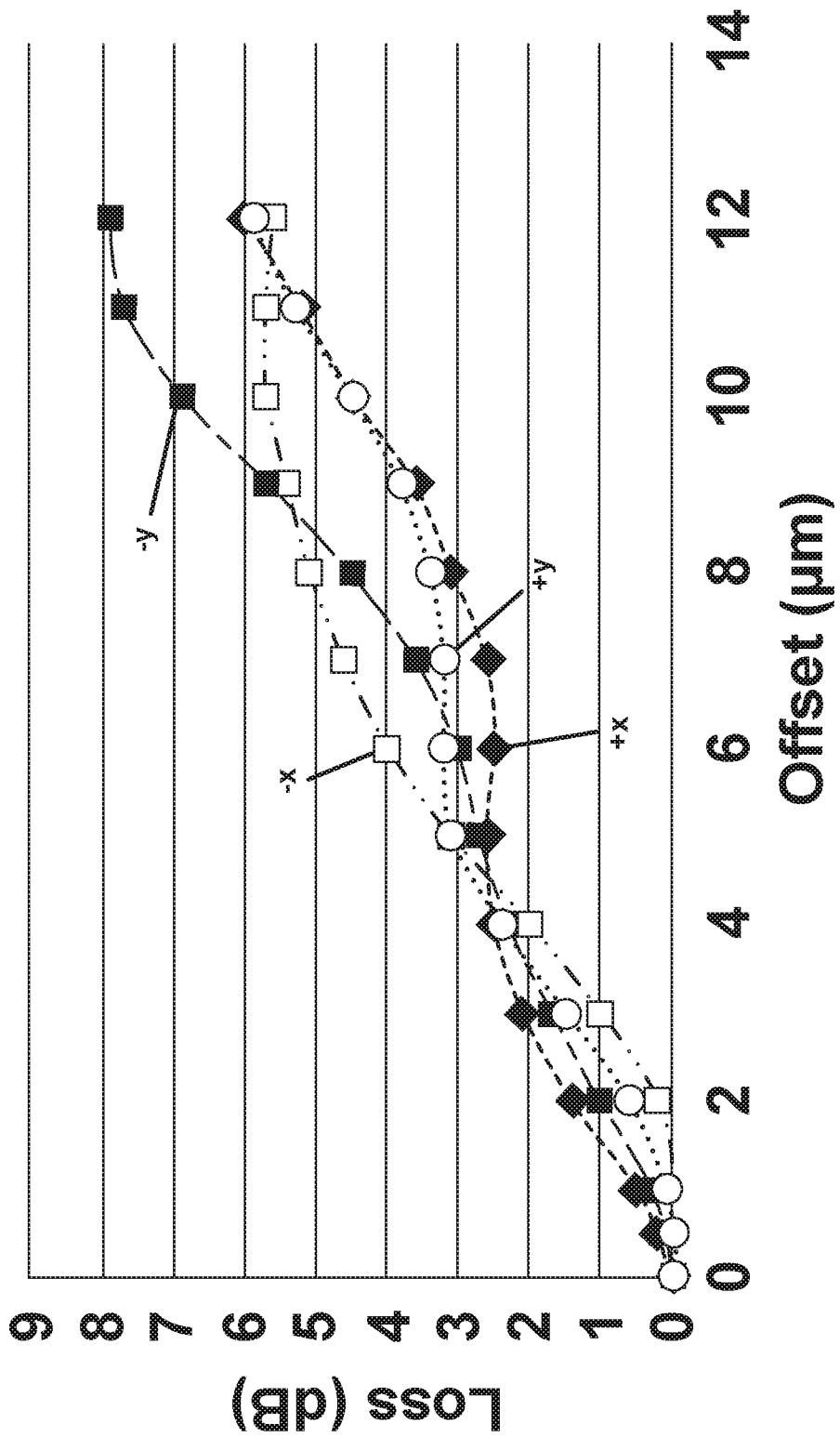

The loss of mode group 4 is shown in FIG. 7D. Like the other modes, 0.5 dB loss is seen at a lateral offset of 1 µm offset, and 1 dB insertion loss is exceeded at 2 µm offset. The specific loss depends on the direction of the offset due to the asymmetrical nature of the mode group.

Experiment 3: Inter-Mode Group Crosstalk vs. Lateral Offset

In addition to an increased loss due to lateral offset, compared to a non-MDM situation, there may also be an increase in cross-talk between channels. In a non-MDM situation, where EF conditions apply, any light that is lost is simply light that failed to propagate in the core, and will not further degrade the signal. In the MDM situation, however, light lost from the mode group could potentially be coupled to another mode group, which will result in mode group crosstalk. Thus, any light that changes modes at the connector interface may result in a degradation of the optical data signal.

The same setup as shown in FIG. 6 was used to measure crosstalk. However, in this case, the light source 602 was coupled to different ports to measure the crosstalk. For example, when the power detector 606 was coupled to measure the output of mode group 1, the light source 602 was coupled, at different times, to inject light into both mode group 1 and mode group 4, i.e. the mode group that co-propagated along the MMFs 412a, 412b with mode group 1.

Figure 8A:
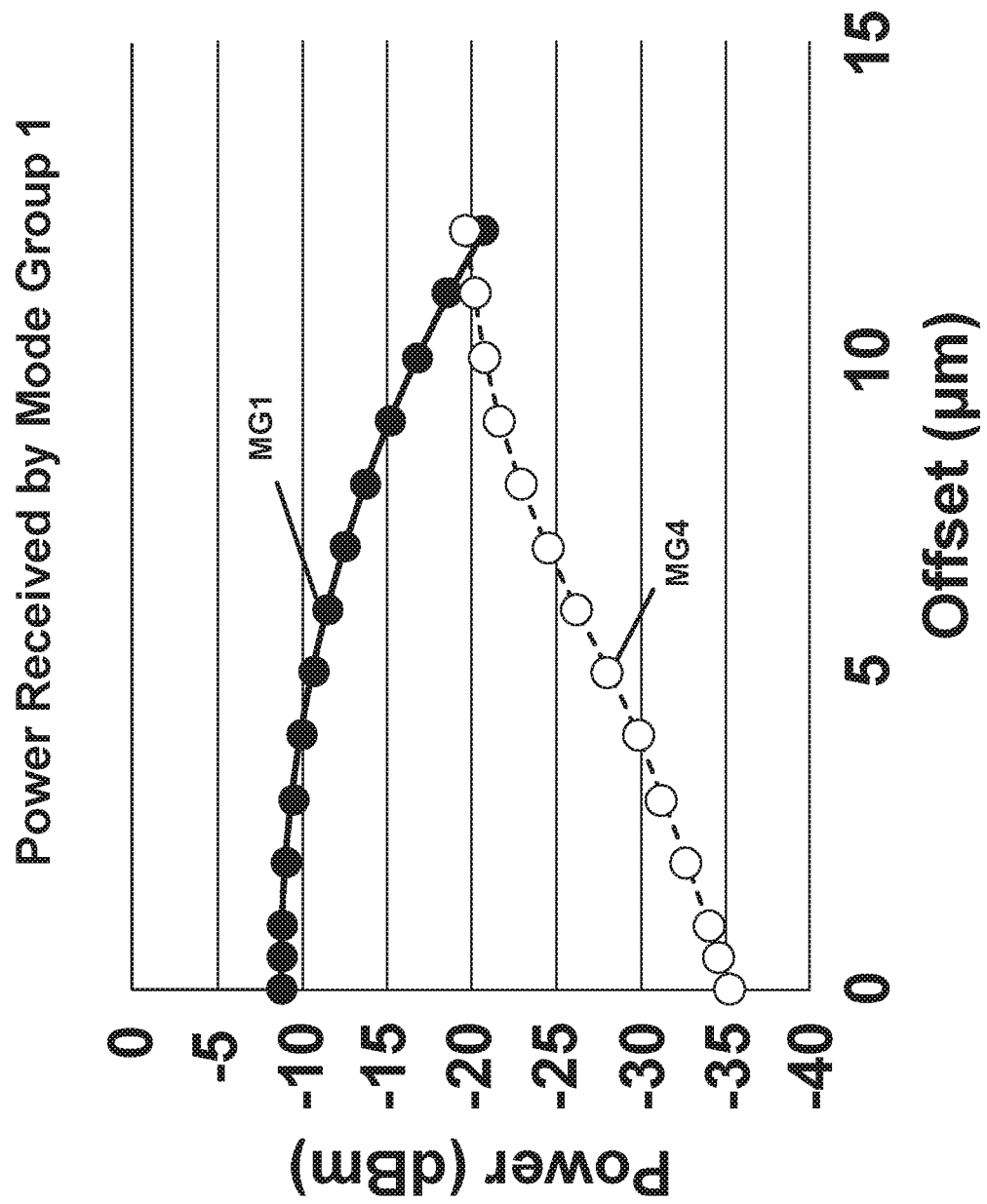
FIGS. 8A-8D present graphs showing power received by respective mode groups, when co-propagating mode groups were excited, as a function of lateral offset between two fibers.

FIG. 8A shows the power received by mode group 1 as a function of lateral offset in the −x direction under two conditions, viz. when the light source 602 is coupled only to mode group 1 (labeled as "MG1"), and when the light source 602 is coupled only to mode group 4 (labeled as "MG4"). As the lateral offset increases, the power from mode group 1 decreases (same data as in FIG. 8) and the power from mode group 4 (the interfering channel) increases. At an offset of 2 µm in the −x direction, where 0.5 dB insertion loss was observed, the extinction ratio between mode group 1 and mode group 4 is degraded by 3 dB. At an offset of 4 µm in the −x direction, where the 1 dB insertion loss was observed, the extinction ratio between m mode group 1 and mode group 4 is 6.6 dB. At a lateral offset of 12 µm, the two curves cross, i.e. more power is detected from the interfering channel. Close to zero offset, the extinction of the signal in mode group 4 is greater than 25 dB.

Figure 8B:
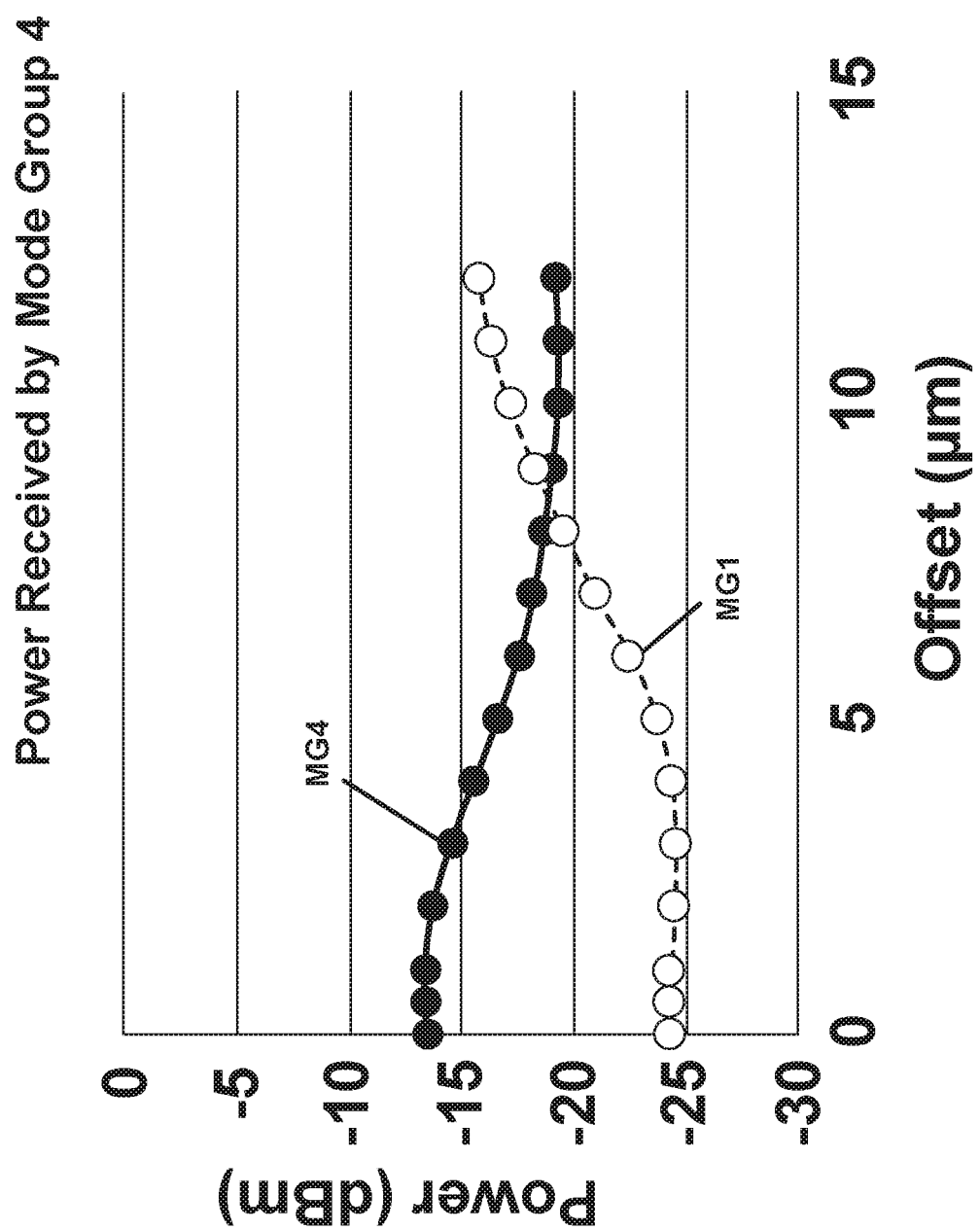

FIG. 8B shows received powers for mode group 4. In this case, any light from mode group 1 is the interfering channel. Here the powers cross at 9 µm offset. However, the extinction ratio remains unchanged over the lateral offset range of 0 to 2 µm. Close to zero offset, the extinction of the signal in mode group 1 is greater than 10 dB.

Figure 8C:
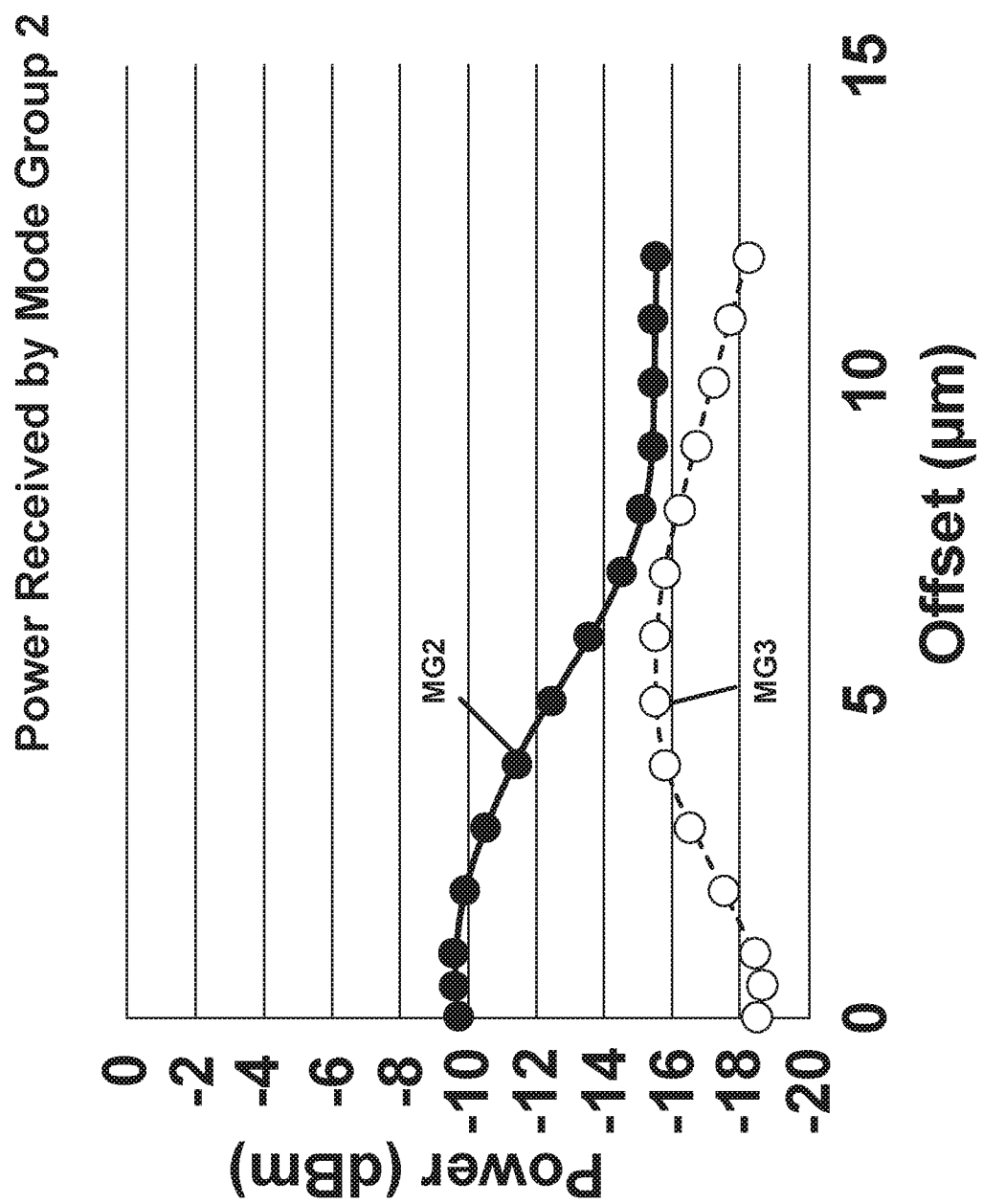

FIG. 8C shows the power received by mode group 2 as a function of lateral offset in the −x direction under two conditions, viz. when the light source 602 is coupled only to mode group 2 (labeled as "MG2"), and when the light source 602 is coupled only to mode group 3 (labeled as "MG3"). While the interfering power in FIG. 8C never exceeds the signal power for mode group 2, the interfering channel is only ~1 dB below the data channel for lateral offset values in excess of 6 µm. Over the lateral offset range of 0 to 2 µm, however, the extinction ratio only changes by 1.2 dB. Close to zero offset, the extinction of the signal in mode group 3 is better than 8 dB.

Figure 8D:
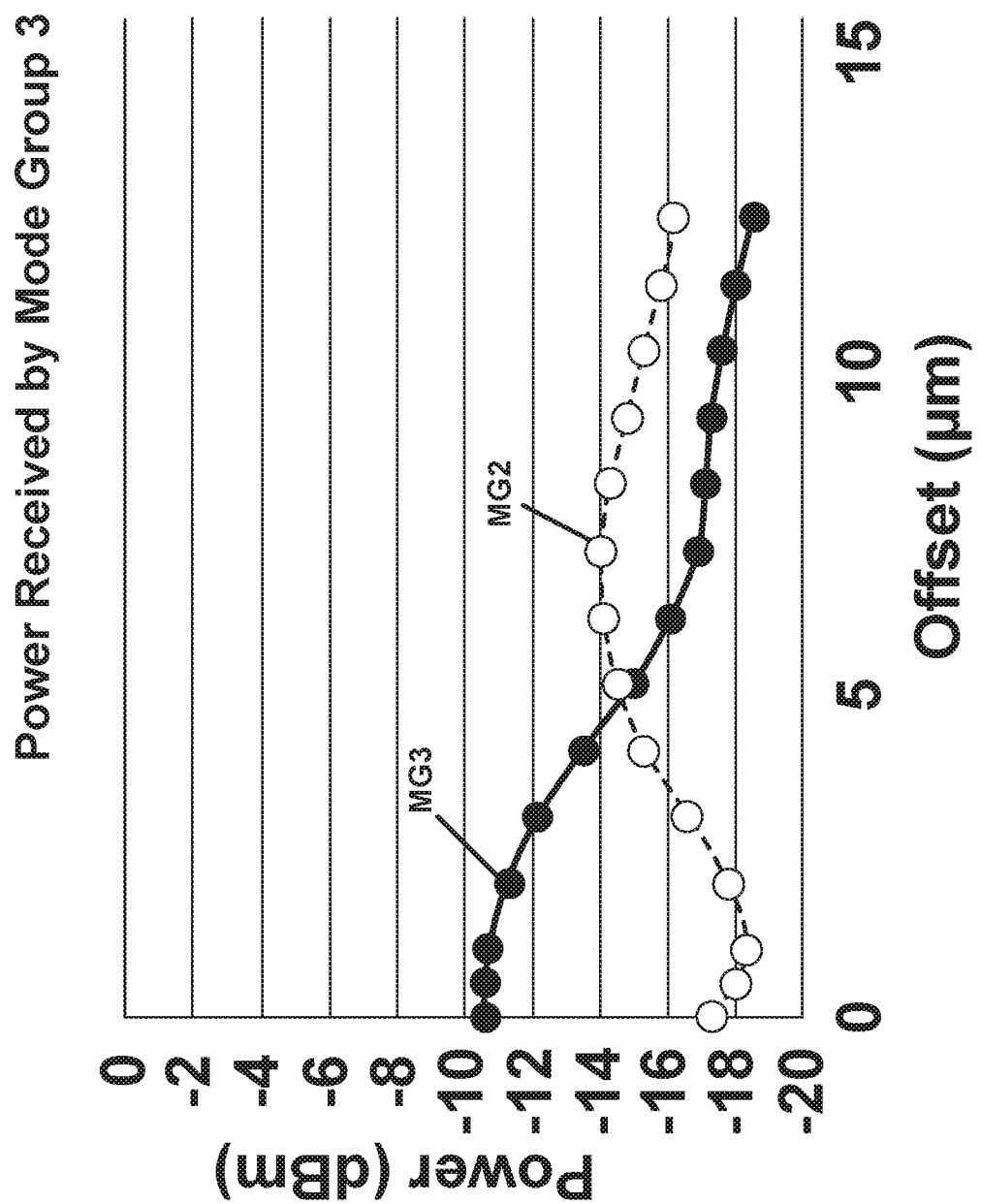

FIG. 8D shows the power received by mode group 3 as a function of lateral offset in the −x direction when the light source 602 is coupled only to mode group 2 ("MG2"), and is coupled only to mode group 3 ("MG3"). For mode group 3 the crossover point occurs at only 5 µm. At 2 µm offset the extinction ratio for mode group 3 degrades from the zero offset value by 0.2 dB. Close to zero offset, the extinction of the signal in mode group 2 is about 7 dB.

Any lateral offset introduced by connectors will decrease the extinction ratio between the signal and interfering channel. Mode group 1 was the most sensitive to cross talk introduced by lateral offset and mode groups 2 and 3 had the lowest extinction ratio between them. In this case, there is only one signal mode and one interfering mode in each direction. If the number of supported modes increases, then the opportunities for interfering modes also increase.

However, it has been shown that maintaining a lateral offset of no more than 2 µm, preferably no more than 1 µm, and more preferably 0.5 µm, the loss and crosstalk are acceptable for multimode optical fiber optical communication systems operating in MDM.

Lateral offsets between two fiber cores of 2 µm or less may be achieved using different approaches. For example, optical fibers with tighter tolerances than those allowed by standards for cladding diameter and core-cladding concentricity may be used to decrease the lateral offset. In addition, tighter tolerances on the amount of epoxy used as well as the mechanical specifications of the ferrule and connector in ferruled connectors can reduce the lateral offset. Additionally, connectors which mate optical fibers without ferrules, such as the ferrule-less connectors noted above and/or incorporated by reference above, also permit smaller lateral offsets: the smaller number of components used in a ferrule-free connector compared to a ferruled connector may further reduce the amount of lateral offset. Furthermore, techniques employed for reducing lateral offset in single mode fibers, such as fiber tuning, may also be used to improve core alignment in multimode fiber connectors.

Various modifications, equivalent processes, as well as numerous structures to which the present invention may be applicable will be readily apparent to those of skill in the art to which the present invention is directed upon review of the present specification. The claims are intended to cover such modifications and devices.

As noted above, the present invention is applicable to fiber optical communication and data transmission systems. Accordingly, the present invention should not be considered

What we claim as the invention is:

1. An optical communications system, comprising:
   a first multimode optical fiber transmitting a mode division multiplexed (MDM) optical signal, the first multimode optical fiber having a first end;
   a second multimode optical fiber, a first end of the second multimode optical fiber coupled to receive the MDM optical signal from the first end of the first multimode optical fiber;
   a multimode fiber connector having a first part holding the first end of the first multimode optical fiber and a second part holding the first end of the second multimode optical fiber, the first and second parts of the multimode fiber connector being in fixed spatial relationship to each other;
   wherein the lateral offset between the first end of the first multimode optical fiber and the first end of the second multimode optical fiber is less than 2 µm.

2. A system as recited in claim 1, wherein the lateral offset is less than 1 µm.

3. A system as recited in claim 1, wherein the lateral offset is less than 0.5 µm.

4. A system as recited in claim 1, further comprising a first light source generating a first optical signal, a second light source generating a second optical signal, a mode division multiplexer coupled to receive the first and second optical signals, and to direct the first optical signal into a first mode group of the first multimode optical fiber at a second end of the first multimode optical fiber, and to direct the second optical signal into a second mode group of the first multimode optical fiber at the second end of the first multimode optical fiber, the first optical signal and the second optical signal propagating within the first multimode optical fiber comprising the MDM optical signal.

5. A system as recited in claim 4, wherein the first mode group of the first multimode optical fiber comprises the $LP_{01}$ mode.

6. A system as recited in claim 5, wherein the second mode group of the first multimode optical fiber comprises at least an $LP_{11}$ mode.

7. A system as recited in claim 5, wherein the second mode group of the first multimode optical fiber comprises at least one of an $LP_{02}$ and an $LP_{21}$ mode.

8. A system as recited in claim 5, wherein the second mode group of the first multimode optical fiber comprises at least one of an $LP_{31}$ and an $LP_{21}$ mode.

9. A system as recited in claim 4, wherein the first mode group is not adjacent to the second mode group.

10. A system as recited in claim 4, wherein the first mode group is adjacent to the second mode group.

11. A system as recited in claim 4, further comprising a third light source generating a third optical signal, wherein the mode division multiplexer receives the third optical signal and directs the third optical signal into a third mode group of the first multimode optical fiber at the second end of the first multimode optical fiber, the first, second and third optical signals propagating within the first multimode optical fiber comprising the MDM optical signal.

12. A system as recited in claim 11, wherein the first, second and third mode groups are adjacent mode groups.

13. A system as recited in claim 11, wherein at least one of the first, second and third mode groups is not adjacent to the other mode groups.

14. A system as recited in claim 11, further comprising a fourth light source generating a fourth optical signal, wherein the mode division multiplexer receives the fourth optical signal and directs the fourth optical signal into a fourth mode group of the first multimode optical fiber at the second end of the first multimode optical fiber, the first, second, third, and fourth optical signals propagating within the first multimode optical fiber comprising the MDM optical signal.

15. A system as recited in claim 14, wherein the first, second, third and fourth mode groups are adjacent mode groups.

16. A system as recited in claim 14, wherein at least one of the first, second, third and fourth mode groups is not adjacent to the other mode groups.

17. A system as recited in claim 14, wherein two of the first, second, third and fourth mode groups are adjacent to comprise a first collection of adjacent mode groups and the other two of the first, second, third and fourth mode groups are adjacent to form a second collection of adjacent mode groups, wherein the first and second collections of adjacent mode groups not being adjacent to each other.

18. A system as recited in claim 4, wherein the first optical signal generated by the first light source is a wavelength division multiplexed signal.

19. A system as recited in claim 4, further comprising a first detector unit coupled to a second end of the second multimode optical fiber via a mode division demultiplexer to detect the first optical signal and a second detector unit coupled to the second end of the second multimode optical fiber via the mode division demultiplexer to detect the second optical signal.

20. A system as recited in claim 1, wherein the multimode fiber connector is a ferrule-less fiber connector.

21. An optical communications system, comprising
   a transmitter portion comprising at least a first optical transmitter capable of generating a first optical signal and a second optical transmitter capable of generating a second optical signal;
   a first multimode optical fiber having a first end and a second end;
   a mode division multiplexer coupled to receive the first optical signal from the first optical transmitter and the second optical signal from the second optical transmitter and coupled to direct a mode division multiplexed (MDM) optical signal into the first end of the first multimode optical fiber, the MDM optical signal comprising the first and second optical signals;
   a second multimode optical fiber having a first end and a second end;
   a multimode fiber connector attached to the second end of the first multimode optical fiber and the first end of the second multimode optical fiber, the multimode fiber connector aligning the first and second multimode optical fibers so as to transmit the MDM optical signal from the first multimode optical fiber to the second multimode optical fiber;
   a mode division demultiplexer coupled to receive the MDM optical signal from the second end of the second multimode optical fiber; and
   a receiver portion comprising at least a first optical receiver coupled to receive the first optical signal from the mode division demultiplexer and a second optical receiver coupled to receive the second optical signal from the mode division demultiplexer.

22. The system as recited in claim 21, wherein a lateral offset between the first and second multimode optical fibers in the multimode fiber connector is less than 2 μm.

23. The system as recited in claim 21, wherein a lateral offset between the first and second multimode optical fibers in the multimode fiber connector is less than 1 μm.

24. The system as recited in claim 21, wherein a lateral offset between the first and second multimode optical fibers in the multimode fiber connector is less than 0.5 μm.

25. The system as recited in claim 21, wherein the first optical signal is a wavelength multiplexed optical signal.

26. The system as recited in claim 25, wherein at least the first optical transmitter comprises two or more sources generating first optical signal components at different wavelengths and a wavelength division multiplexer to combine the first optical signal components to produce the first optical signal.

27. The system as recited in claim 21, wherein the mode division multiplexer is a multi-plane light conversion multiplexer.

28. The system as recited in claim 21, wherein the first optical receiver receives the second optical signal at a signal level at least 7 dB less than the first optical signal and the second optical receiver receives the first optical signal at a signal level that is at least 7 dB less than the second optical signal.

\* \* \* \* \*